United States Patent
Koo et al.

(10) Patent No.: US 12,261,970 B2
(45) Date of Patent: Mar. 25, 2025

(54) METHOD FOR MANUFACTURING DISPLAY MODULE COMPRISING SENSOR, AND ELECTRONIC DEVICE COMPRISING DISPLAY MODULE

(71) Applicant: SAMSUNG ELECTRONICS CO., LTD., Suwon-si (KR)

(72) Inventors: Hyojun Koo, Suwon-si (KR); Bongjae Rhee, Suwon-si (KR); Suyeon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 516 days.

(21) Appl. No.: 17/310,551

(22) PCT Filed: Feb. 18, 2020

(86) PCT No.: PCT/KR2020/002341
§ 371 (c)(1),
(2) Date: Aug. 10, 2021

(87) PCT Pub. No.: WO2020/171559
PCT Pub. Date: Aug. 27, 2020

(65) Prior Publication Data
US 2022/0210254 A1 Jun. 30, 2022

(30) Foreign Application Priority Data
Feb. 19, 2019 (KR) .................. 10-2019-0019548

(51) Int. Cl.
*H04M 1/02* (2006.01)
*G06F 1/16* (2006.01)
*G06V 40/13* (2022.01)

(52) U.S. Cl.
CPC ........ *H04M 1/0266* (2013.01); *G06F 1/1637* (2013.01); *G06F 1/1656* (2013.01);
(Continued)

(58) Field of Classification Search
CPC .... G06F 1/1637; G06F 1/1656; G06F 1/1684; H04M 1/0266; H04M 1/0277; H04M 2250/22
See application file for complete search history.

(56) References Cited

U.S. PATENT DOCUMENTS 9,119,311 B2    8/2015   Yamanaka et al.
9,984,270 B2    5/2018   Yousefpor et al.
(Continued)

FOREIGN PATENT DOCUMENTS

CN    107241465    10/2017
CN    108844562    11/2018
(Continued)

OTHER PUBLICATIONS

Indian Office Action issued Apr. 20, 2023 in corresponding Indian Patent Application No. 202117037228.
(Continued)

*Primary Examiner* — Nidhi Thaker
(74) *Attorney, Agent, or Firm* — Nixon & Vanderhye, P.C.

(57) ABSTRACT

An electronic device according to various embodiments can comprise: a housing; a display module including a first panel including a first surface, a second surface facing the first surface, and a plurality of pixels disposed between the first surface and the second surface, a cover layer disposed on the first surface of the first panel and forming one surface of the housing, and a second panel disposed on the second surface of the first panel; and a sensor coupled to the second surface of the first panel and forming a sensing area in the one surface of the housing.

14 Claims, 15 Drawing Sheets

(52) U.S. Cl.
CPC .......... *G06F 1/1684* (2013.01); *G06F 1/1626* (2013.01); *G06V 40/1306* (2022.01); *H04M 1/0277* (2013.01); *H04M 2250/22* (2013.01)

(56) References Cited

U.S. PATENT DOCUMENTS

| | | | |
|---|---|---|---|
| 9,986,072 | B2 | 5/2018 | Lee et al. |
| 10,147,757 | B2 | 12/2018 | Lee et al. |
| 10,181,070 | B2 | 1/2019 | Smith et al. |
| 10,983,558 | B2 | 4/2021 | Kim et al. |
| 11,334,114 | B2 | 5/2022 | Kim et al. |
| 11,375,052 | B2* | 6/2022 | Heo ................... G06V 40/1306 |
| 2010/0124956 | A1* | 5/2010 | Hong ................... G06F 1/1626 |
| | | | 455/575.4 |
| 2010/0231558 | A1* | 9/2010 | Kwak ..................... G06F 3/043 |
| | | | 345/179 |
| 2013/0176666 | A1 | 7/2013 | Yamanaka et al. |
| 2014/0118967 | A1 | 5/2014 | Lee |
| 2014/0341447 | A1 | 11/2014 | Cho |
| 2015/0036065 | A1 | 2/2015 | Yousefpor et al. |
| 2015/0324627 | A1 | 11/2015 | Cho |
| 2016/0224816 | A1 | 8/2016 | Smith et al. |
| 2016/0254312 | A1 | 9/2016 | Lee et al. |
| 2016/0275830 | A1 | 9/2016 | You |
| 2017/0017824 | A1 | 1/2017 | Smith et al. |
| 2017/0160766 | A1* | 6/2017 | Gupta ................... G02F 1/1333 |
| 2017/0287992 | A1 | 10/2017 | Kwak et al. |
| 2017/0300736 | A1* | 10/2017 | Song ................... G06V 40/1312 |
| 2017/0364763 | A1* | 12/2017 | Jin ........................ G06F 3/0412 |
| 2017/0372123 | A1 | 12/2017 | Kim et al. |
| 2018/0007181 | A1 | 1/2018 | Lee et al. |
| 2018/0081098 | A1 | 3/2018 | Smith et al. |
| 2018/0151641 | A1* | 5/2018 | Choo ................... H04M 1/0266 |
| 2018/0204040 | A1 | 7/2018 | Kwon |
| 2018/0293420 | A1* | 10/2018 | Kim ....................... H05K 1/189 |
| 2019/0246018 | A1* | 8/2019 | Rho ........................ G03B 9/08 |
| 2020/0057467 | A1* | 2/2020 | Kim ..................... G06F 1/1626 |
| 2020/0202097 | A1 | 6/2020 | Kim et al. |
| 2020/0258957 | A1 | 8/2020 | Kwak et al. |
| 2020/0364433 | A1 | 11/2020 | Kim et al. |
| 2021/0004117 | A1 | 1/2021 | Kim et al. |
| 2021/0240224 | A1 | 8/2021 | Kim et al. |
| 2022/0253095 | A1 | 8/2022 | Kim et al. |

FOREIGN PATENT DOCUMENTS

| | | |
|---|---|---|
| EP | 3 388 977 | 10/2018 |
| JP | 2013-142985 | 7/2013 |
| KR | 20140055001 A | 5/2014 |
| KR | 20140134459 A | 11/2014 |
| KR | 10-2016-0071352 | 6/2016 |
| KR | 10-2016-0096927 | 8/2016 |
| KR | 20180083700 A | 7/2018 |
| KR | 10-2018-0098066 | 9/2018 |
| KR | 10-2018-0116188 | 10/2018 |
| KR | 10-2019-0062143 | 6/2019 |
| WO | 2018/155851 | 8/2018 |
| WO | WO 2019/107890 | 6/2019 |

OTHER PUBLICATIONS

Chinese Office Action issued May 6, 2023 in corresponding Chinese Patent Application No. 202080015124.0.
International Search Report issued in PCT/KR2020/002341 dated Jun. 15, 2020 (5 pages).
Written Opinion of the International Searching Authority issued in PCT/KR2020/002341 dated Jun. 15, 2020 (4 pages).
Extended Search Report and Written Opinion issued Feb. 1, 2022 in counterpart European Patent Application No. No. 20759254.4.
Office Action dated Nov. 22, 2023 in corresponding Chinese Patent Application No. 202080015124.0 and English-language translation.
Office Action dated Dec. 14, 2023 in corresponding Korean Patent Application No. 10-2019-0019548 and English-language translation.
Office Action dated Feb. 29, 2024 for Korean patent application KR 10-2019-0019548 and English-language translation.
Notice of Allowance dated Apr. 8, 2024 for Chinese patent application CN 202080015124.0 and English-language translation.
Hearing Notice dated Oct. 10, 2024 in Indian Patent Application No. 202117037228 and English-language translation.

* cited by examiner

METHOD FOR MANUFACTURING DISPLAY MODULE COMPRISING SENSOR, AND ELECTRONIC DEVICE COMPRISING DISPLAY MODULE

CROSS-REFERENCE TO RELATED APPLICATIONS

This application is a national stage of International Application No. PCT/KR2020/002341 designating the United States, filed on Feb. 18, 2020, in the Korean Intellectual Property Receiving Office and claiming priority to Korean Patent Application No. 10-2019-0019548, filed on Feb. 19, 2019, in the Korean Intellectual Property Office, the disclosures of which are incorporated by reference herein in their entireties.

BACKGROUND

Field

The disclosure relates to a display module including a sensor and a method for manufacturing the display module. In addition, the disclosure relates to an electronic device including a display module.

Description of Related Art

An electronic device may include a sensor for biometric information recognition. For example, the electronic device may include a sensor for recognizing a fingerprint. The sensor for recognizing the fingerprint may be visible from the outside the electronic device. For example, the sensor for recognizing the fingerprint may be disposed at a lower end of a display area on a front surface of a housing of the electronic device. As another example, a sensor for recognizing a fingerprint may be disposed on a rear surface of the housing of the electronic device.

As the display of the portable electronic device increases in size, a size of an area excluding the display on the front surface of the electronic device may be relatively reduced. Therefore, research for mounting various sensors on the front surface of the electronic device while increasing in size of the display are continuously being conducted. For example, attempts to realize a large screen by disposing a fingerprint sensor of the electronic device on a display area of the display and reducing or removing a non-display area are continuously being made.

A sensor may be disposed on a rear surface of a display module. The display module may include a cover panel attached to a rear surface of a display panel. A hole may be formed in at least a partial area of the cover panel so that a fingerprint sensor acquires a fingerprint input on a front surface of the display module at a rear surface of a display. In this case, a hole having a size larger than that of a sensor surface of the sensor may be formed due to security of a minimum space and an interference in the process. When the sensor is mounted, a gap may be formed between the sensor and the hole.

External light may be introduced into the display panel through the gap. The introduced external light may generate a photoelectric effect. When the display displays a low grayscale image, the display area corresponding to the gap may be appeared to be relatively bright compared to other portions of the display by current leakage due to the photoelectric effect. When the display displays a high grayscale image, the display area corresponding to the gap may appear to be relatively dark compared to other portions of the display by the current leakage due to the photoelectric effect.

SUMMARY

An electronic device according to an example embodiment of the present disclosure includes: a housing; a display module including a first panel including a first surface, a second surface facing the first surface, and a plurality of pixels disposed between the first surface and the second surface, a cover layer disposed on the first surface of the first panel, and a second panel disposed on the second surface of the first panel; and a sensor disposed on the second surface of the first panel, wherein the display module includes an opening passing through the second panel and in which at least a portion of the sensor is disposed, the second panel includes a first layer coupled to the first panel on one surface thereof and a second layer coupled to the first layer on an opposite surface of the one surface of the first layer, the opening corresponding to an area on which a first opening formed in the first layer and a second opening formed in the second layer overlap each other, the sensor including a flexible printed circuit board (FPCB) extending from a mounting area of the sensor in a first direction, and the second opening including an area corresponding to the first opening and a protrusion extending from the area corresponding to the first opening in the first direction.

A display device according to an example embodiment of the present disclosure includes: a first panel including a first surface, a second surface facing the first surface, and a plurality of pixels disposed between the first surface and the second surface; a cover layer disposed on the first surface of the first panel; a display module including a second panel disposed on the second surface of the first panel; and a sensor coupled on the second surface of the first panel, wherein the display module includes an opening passing through at least a portion of the second panel and in which at least a portion of the sensor is disposed, the second panel including a first layer coupled to the first panel on one surface thereof and a second layer coupled to the first layer on an opposite surface of the one surface of the first layer, the opening corresponding to an area on which a first opening formed in the first layer and a second opening formed in the second layer overlap each other, the sensor including a flexible printed circuit board (FPCB) extending from a mounting area of the sensor in a first direction, and the second opening including an area corresponding to the first opening and an extension part extending from the area corresponding to the first opening in the first direction.

According to various embodiments disclosed in the present disclosure, the hole for mounting the sensor disposed under the display may have a reduced visibility from the outside of the electronic device.

In addition, the various effects that are directly or indirectly identified through the present disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In the description with reference to the drawings, identical or similar reference symbols may be used for identical or similar elements.

DETAILED DESCRIPTION

Hereinafter, various example embodiments of the disclosure will be described with reference to the accompanying drawings. However, this does not limit the present disclosure to specific embodiments, but it should be understood that the present disclosure covers all modifications, equivalents, and alternatives according to various example embodiments of the present disclosure.

Figure 1:
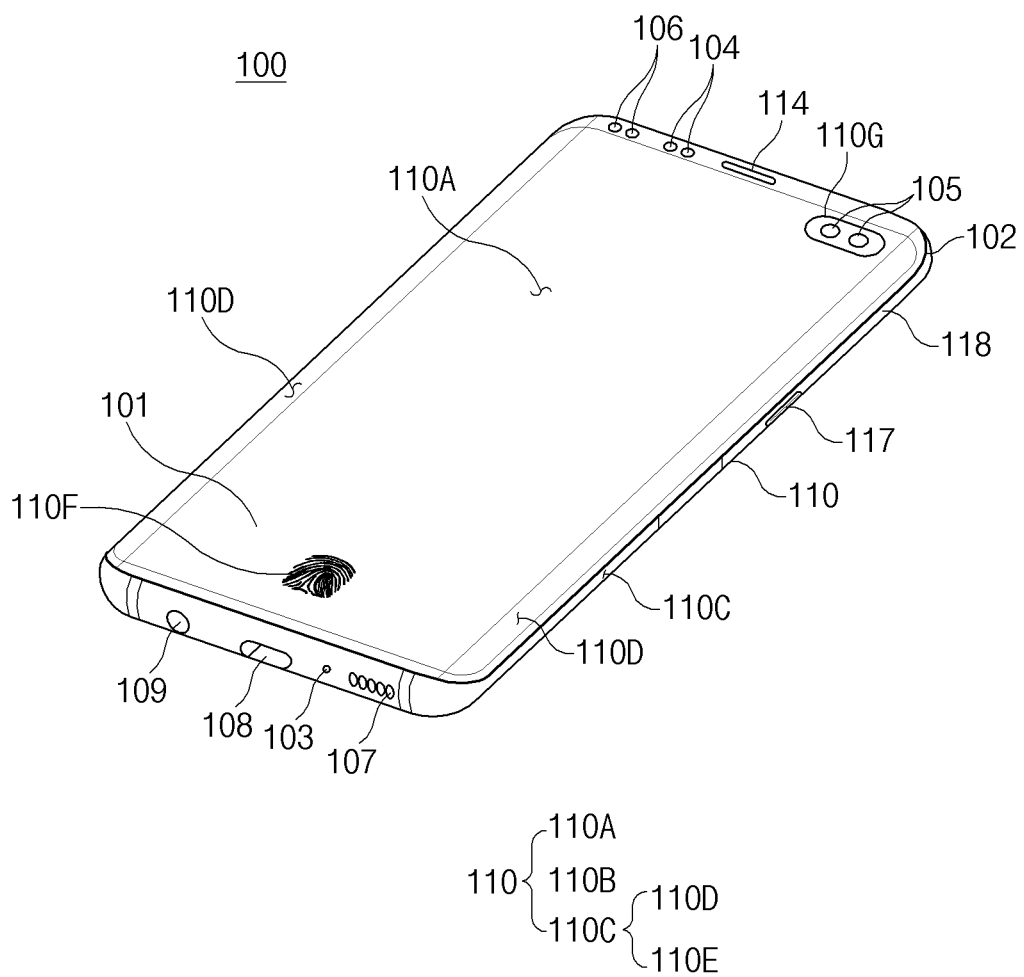
FIG. 1 is a front perspective view of an electronic device according to various embodiments.
Figure 2:
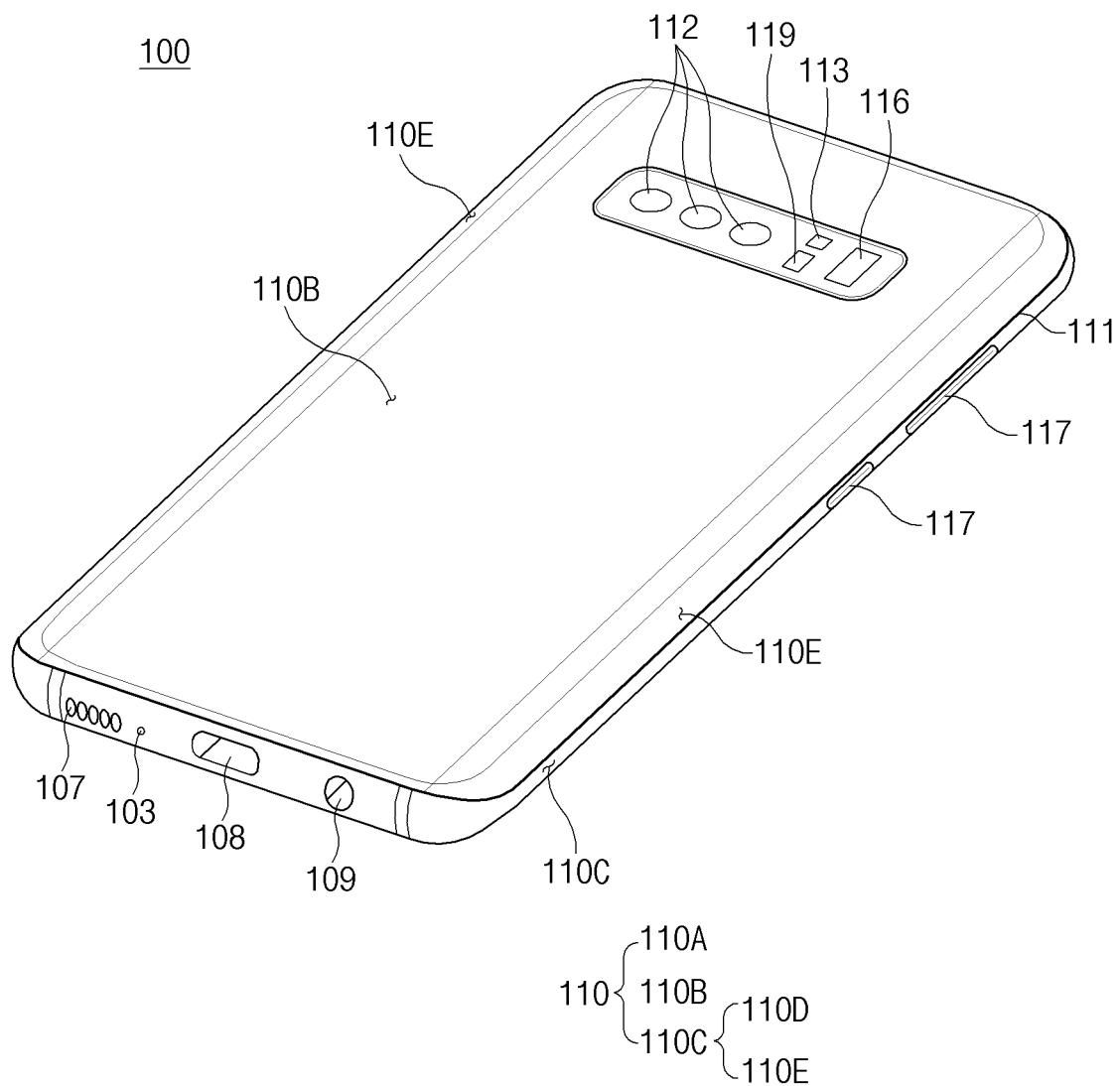
FIG. 2 is a rear perspective view of the electronic device of FIG. 1 according to various embodiments.

FIG. 1 is a front perspective view of an electronic device according to various embodiments. FIG. 2 is a rear perspective view of the electronic device of FIG. 1 according to various embodiments.

Referring to FIGS. 1 and 2, an electronic device 100 according to an embodiment includes a housing 110 having a first surface (or front surface) 110A, a second surface (or rear surface) 110B, and a side surface 110C surrounding a space between the first surface 110A and the second surface 110B.

In an embodiment (not shown), the housing 110 may refer to a structure forming some of the first surface 110A, the second surface 110B, and the side surface 110C of FIG. 1.

According to an embodiment, at least a portion of the first surface 110A may be formed by a substantially transparent front plate 102 (e.g., a glass plate including various coating layers, or a polymer plate). The second surface 110B may be formed by a substantially opaque rear plate 111. The rear plate 111 may be made of, for example, applied or colored glass, ceramic, a polymer, metal (e.g., aluminum, stainless steel (STS), or magnesium), or a combination of at least two of the above materials. The side surface 110C may be coupled to the front plate 102 and the rear plate 111 and may be formed by a side bezel structure (or "side member") 118 including a metal and/or a polymer.

In various embodiments, the rear plate 111 and the side bezel structure 118 may be integrated with each other and include the same material (e.g., a metal material such as aluminum).

In the illustrated embodiment, the front plate 102 may include two first areas 110D, which are curved toward the rear plate 111 from the first surface 110A and extend seamlessly, on both ends of each of long edges of the front plate 102.

In the illustrated embodiment (see FIG. 2), the rear plate 111 includes two second areas 110E, which are curved toward the front plate 102 from the second surface 110B and extend seamlessly, on both ends of each of long edges.

In various embodiments, the front plate 102 (or the rear plate 111) may include only one of the first areas 110D (or the second areas 110E). In an embodiment, the front plate 102 (or the rear plate 111) may not include a portion of the first areas 110D (or the second areas 110E).

In various embodiments, when viewed from a side of the electronic device 100, the side bezel structure 118 may have a first thickness (or a width) at a side (e.g., a short side) that belongs to the first areas 110D or the second areas 110E as described above and a second thickness less than the first thickness at a side (e.g., a long side) that is included in the first areas 110D or the second areas 110E.

According to an embodiment, the electronic device 100 includes at least one or more of a display 101, audio modules 103, 107, and 114, sensor modules 104, 116, and 119, camera modules 105, 112, and 113, and a key input device 117, a light emitting element 106, and connector holes 108 and 109. In various embodiments, in the electronic device 100, at least one (e.g., the key input device 117, the sensor module 104, or the light emitting element 106) of the components may be omitted, or other components may be added.

The display 101 may be visible, for example, through a corresponding portion of the front plate 102. In various embodiments, at least a portion of the display 101 may be visible through the front plate 102 including the first surface 110A and the first areas 110D of the side surface 110C.

In various embodiments, an edge of the display 101 may have substantially the same shape as an adjacent outer shape of the front plate 102. In an embodiment (not shown), in order to expand the area to which the display 101 is exposed, a distance between an outer portion of the display 101 and an outer portion of the front plate 102 may be substantially uniform.

In an embodiment, a surface of the housing 110 (or the front plate 102) may include a screen display area formed as the display 101 is visually exposed (e.g., visible). For example, the screen display area may include the first surface 110A and the first areas 110D of the side surface.

In the illustrated example embodiment, the screen display areas 110A and 110D may include a sensing area 110F configured to acquire biometric information of a user. For example, it may be understood as that "the screen display areas 110A and 110D include the sensing area 110F" may refer, for example, to at least a portion of the sensing area 110F overlapping the screen display areas 110A and 110D. For example, the sensing area 110F may refer, for example, to an area that is capable of displaying visual information through the display 101, like other areas of the screen display areas 110A and 110D and is capable of additionally acquiring the user's biometric information (e.g., a fingerprint).

In an embodiment, the screen display areas 110A and 110D of the display 101 may include an area 110G to which the first camera module 105 (e.g., a punch hole camera) is visually exposed. At least a portion of an edge of an area to which the first camera device 105 is exposed may be surrounded by the screen display areas 110A and 110D.

In an embodiment (not shown), a recess or opening is formed in a portion of the screen display areas 110A and 110D of the display 101, and at least one or more of the audio module 114, the first sensor module 104, and the light emitting element 106, which are aligned with the recess or opening, may be disposed on the portion of the screen display areas 110A and 110D.

In an embodiment (not shown), at least one or more of the audio module 114, the sensor modules 104, 116, and 119, and the light emitting element 106 may be disposed on rear surfaces of the screen display areas 110A and 110D of the display 101.

In an embodiment (not shown), the display 101 may be coupled to or disposed adjacent to a touch sensing circuit, a pressure sensor that is capable of measuring an intensity (pressure) of touch, and/or a digitizer that detects a magnetic field-type stylus pen.

In various embodiments, at least a portion of the sensor modules 104, 116, and 119 and/or at least a portion of the key input device 117 may be disposed on the side surface 110C (e.g., the first areas 110D and/or the second areas 110E).

The audio modules 103, 107, and 114 may include a microphone hole 103 and speaker holes 107 and 114. A microphone for acquiring external sound may be disposed inside the microphone hole 103, and in various embodiments, a plurality of microphones may be disposed inside the microphone hole 303 in order to sense a direction of the sound. The speaker holes 107 and 114 may include an external speaker hole 107 and a call receiver hole 114. In various embodiments, the speaker holes 107 and 114 and the microphone hole 103 may be implemented as a single hole, or a speaker may be provided without the speaker holes 107 and 114 (e.g., a piezo speaker).

The sensor modules 104, 116, and 119 may generate electrical signals or data values corresponding to an internal operating state of the electronic device 100 or an external environmental state. For example, the sensor modules 104, 116, and 119 may include a first sensor module 104 (e.g., a proximity sensor) disposed on the first surface 110A of the housing 110, a second sensor module 116 (e.g., the TOF camera device) disposed on the second surface 110B of the housing 110, a third sensor module 119 (e.g., an HRM sensor) disposed on the second surface 110B of the housing 110, and/or a fourth sensor module (e.g., a sensor 190 of FIG. 3) (e.g., fingerprint sensor) coupled to the display 101.

In various embodiments, the second sensor module 116 may include the TOF camera device for measuring a distance.

In various embodiments, at least a portion of the fourth sensor module (e.g., the sensor 190 of FIG. 3) may be disposed under the screen display areas 110A and 110D. For example, the fourth sensor module may be disposed in a recess (e.g., a recess 139 of FIG. 3) formed in the rear surface of the display 101. That is, the fourth sensor module (e.g., the sensor 190 of FIG. 3) is not exposed to the screen display areas 110A and 110D, and a sensing area 110F may be formed on at least a portion of the screen display areas 110A and 110D.

In various embodiments (not shown), the fingerprint sensor may be disposed on the second surface 110B as well as the first surface 110A (e.g., the screen display areas 110A and 110D) of the housing 110.

In various embodiments, the electronic device 100 may further include sensor modules that are not shown, for example, a gesture sensor, a gyro sensor, an atmospheric pressure sensor, a magnetic sensor, an acceleration sensor, a grip sensor, a color sensor, an IR (infrared) sensor, a biosensor, a temperature sensor, a humidity sensor, an illuminance sensor, etc., but is not limited thereto.

The camera modules 105, 112, and 113 may include a first camera device 105 (e.g., the punch hole camera device) exposed to the first surface 110A of the electronic device 100 and a second camera device 112 exposed to the second surface 110B, and/or a flash 113.

In the illustrated embodiment, the first camera device 105 may be exposed through a portion of the screen display area 110D of the first surface 110A. For example, the first camera device 105 may be exposed to a partial area of the screen display area 110D through an opening (not shown) defined in a portion of the display 101.

In the illustrated embodiment, the second camera device 112 may include a plurality of camera devices (e.g., a dual camera or a triple camera). However, the second camera device 112 is not necessarily limited as including the plurality of camera devices and thus may include one camera device.

The camera devices 105 and 112 may include one or more lenses, an image sensor, and/or an image signal processor. The flash 113 may include, for example, a light emitting diode or a xenon lamp. In various embodiments, two or more lenses (the infrared camera, the wide-angle lens, and the telephoto lens) and image sensors may be disposed on one surface of the electronic device 100.

The key input device 117 may be disposed on the side surface 110C of the housing 110. In an embodiment, the electronic device 100 may not include some or all of the above-described key input devices 117, and the key input device 117 that is not included may be implemented in a different form on the display 101, like a soft key. In various embodiments, the key input device may include a sensor module (e.g., the sensor 190 of FIG. 3) that forms the sensing area 110F included in the screen display areas 110A and 110D.

The light emitting element 106 may be disposed, for example, on the first surface 110A of the housing 110. The light emitting element 106 may provide, for example, state information of the electronic device 100 in the form of light. In an embodiment, the light emitting element 106 may provide, for example, a light source that is interlocked with an operation of the first camera device 105. The light emitting element 106 may include, for example, an LED, an IR LED, and a xenon lamp.

The connector holes 108 and 109 may include a first connector hole 108 that is capable of accommodating a connector (e.g., an USB connector) for transmitting and receiving power and/or data to and from an external electronic device and/or a second connector hole 109 (e.g., an earphone jack) that is capable of accommodating a connector for transmitting and receiving audio signal to and from the external electronic device.

Figure 3:
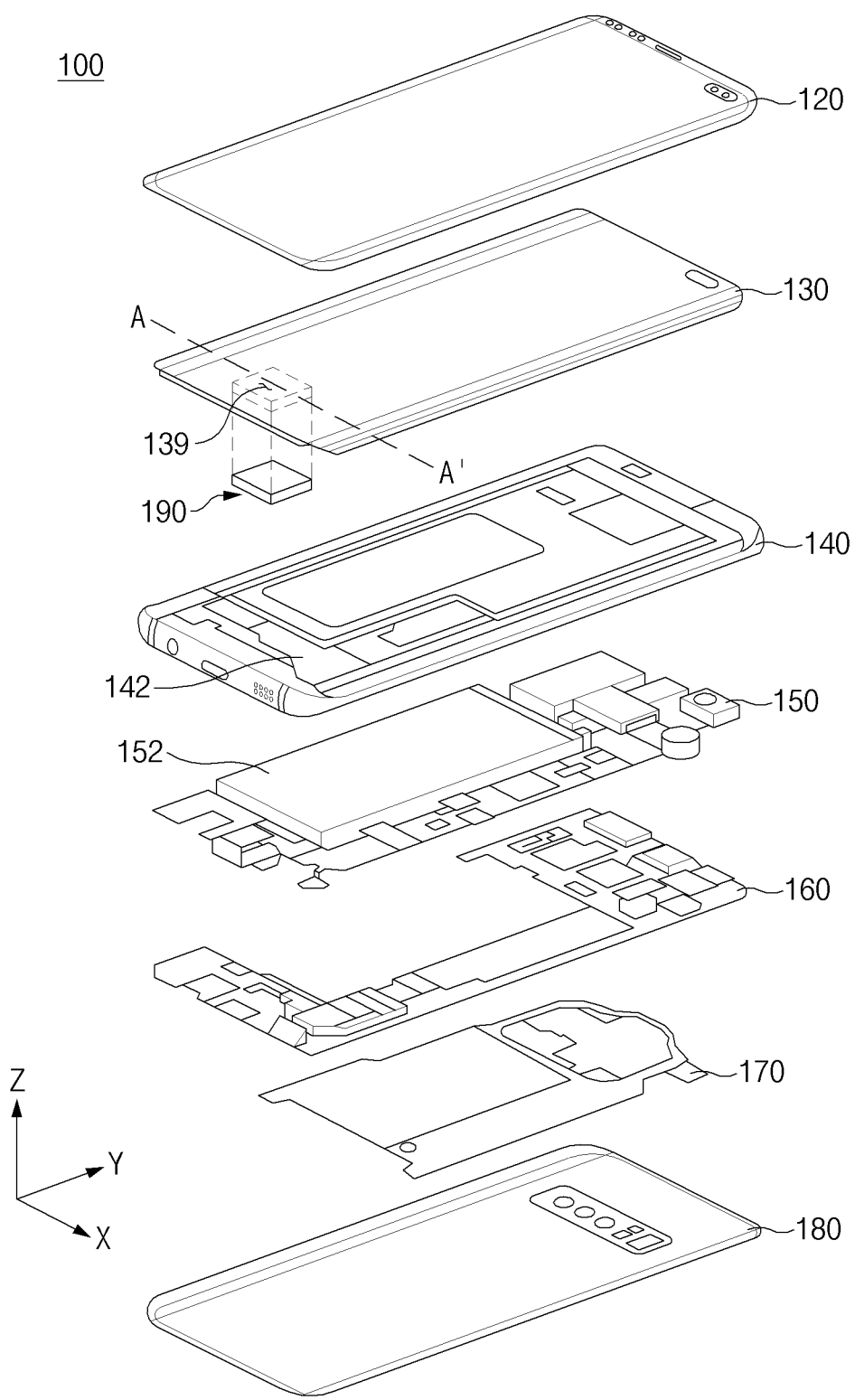
FIG. 3 is an exploded perspective view of the electronic device of FIG. 1 according to various embodiments.

FIG. 3 is an exploded perspective view of the electronic device of FIG. 1 according to various embodiments.

Referring to FIG. 3, the electronic device 100 may include a side member (e.g., bezel) 140, a first support member 142 (e.g., a bracket), a front plate 120, and a display 130 (e.g., the display 101 of FIG. 1), a printed circuit board 150, a battery 152, a second support member 160 (e.g., a rear case), an antenna 170, and a rear plate 180. In various embodiments, in the electronic device 100, at least one (e.g., the first support member 142 or the second support member 160) of the components may be omitted, or other components may be added. At least one of the components of the electronic device 100 may be the same as or similar to at least one of the components of the electronic device 100 of FIG. 1 or 2, and thus, duplicated descriptions thereof will be omitted below.

The first support member 142 may be disposed inside the electronic device 100 in order to be connected to the side member 140 or may be integrated with the side member 140. The first support member 142 may be made of, for example, a metal material and/or a non-metal (e.g., a polymer) material. The first support member 142 may have one surface to which the display 130 is coupled and the other surface to which the printed circuit board 150 is coupled. A processor, a memory, and/or an interface may be mounted on the printed circuit board 150. The processor may include, for example, one or more of a central processing unit, an application processor, a graphic processing unit, an image signal processor, a sensor hub processor, or a communication processor.

The memory may include, for example, a volatile memory or a nonvolatile memory.

The interface may include, for example, a high definition multimedia interface (HDMI), a universal serial bus (USB) interface, an SD card interface, and/or an audio interface. The interface may, for example, electrically or physically connect the electronic device 100 to the external electronic device and may include a USB connector, an SD card/MMC connector, or an audio connector.

The battery 152 may be a device for supplying power to at least one component of the electronic device 100 and may include, for example, a non-rechargeable primary cell, a rechargeable secondary cell, or a fuel cell. At least a portion of the battery 152 may be disposed, for example, on substantially the same plane as the printed circuit board 150. The battery 152 may be integrally disposed inside the electronic device 100 or may be disposed to be detachable from the electronic device 100.

The antenna 170 may be disposed between the rear plate 180 and the battery 152. The antenna 170 may include, for example, a near field communication (NFC) antenna, a wireless charging antenna, and/or a magnetic secure transmission (MST) antenna. The antenna 170 may perform, for example, short-range communication with the external device or may wirelessly transmit/receive power required for charging. In an embodiment, an antenna structure may be provided by a portion of the side member 140 and/or the first support member 142 or a combination thereof.

In the illustrated embodiment, the electronic device 100 may further include a sensor 190 coupled to the display 130. The sensor 190 may be disposed in the recess 139 (e.g., an opening 225 of FIG. 4) formed in the rear surface of the display 130. The sensor 190 may form a sensing area (e.g., the sensing area 110F of FIG. 1) on a portion of the first plate 120.

Figure 4:
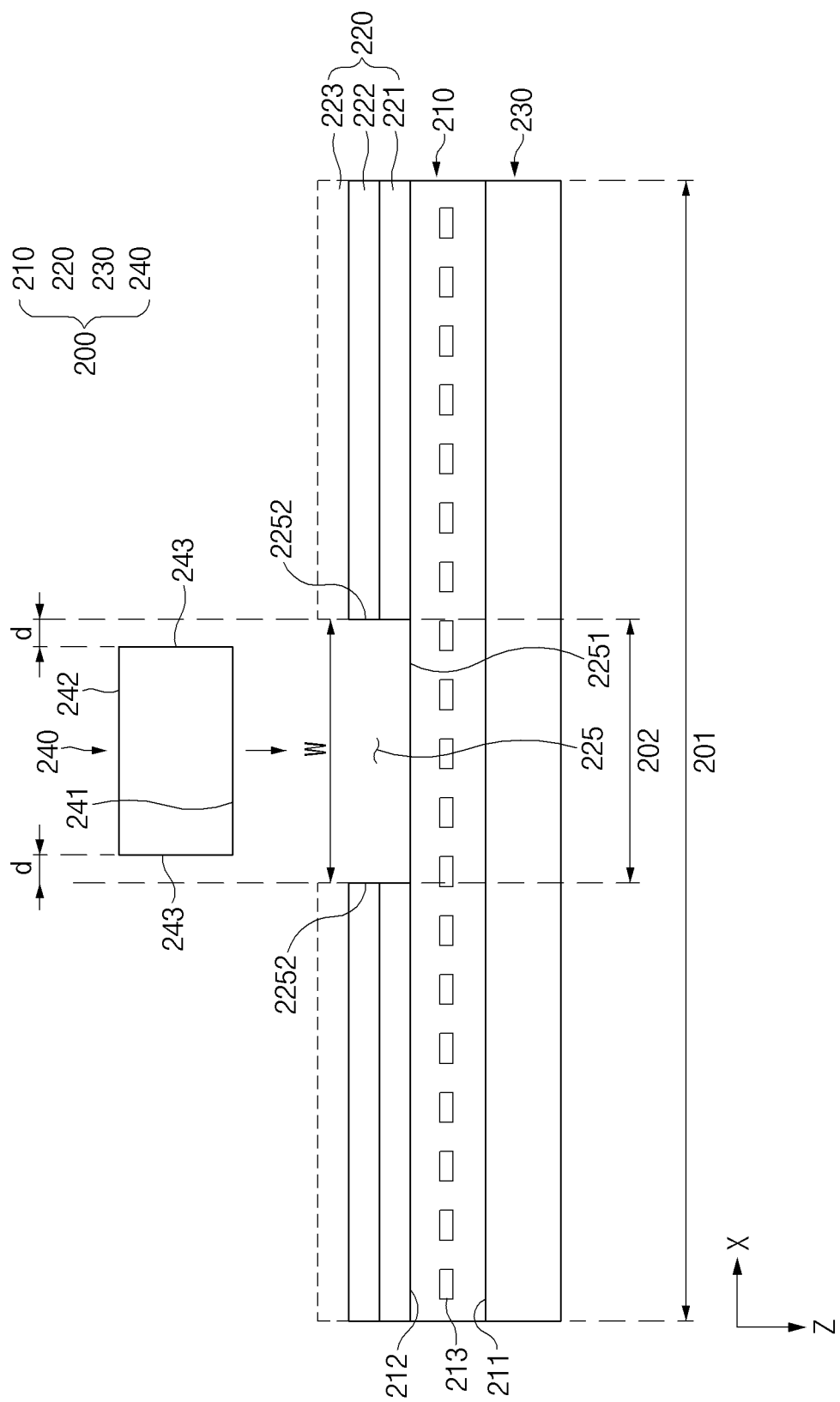
FIG. 4 is a cross-sectional view illustrating a display of the electronic device according to various embodiments.

FIG. 4 is a cross-sectional view illustrating an example display module 200 of the electronic device 100 according to various embodiments. FIG. 4 is a cross-sectional view taken along line A-A' of FIG. 3.

For example, the display module 200 may include panels or layers 210, 220, and 230 (e.g., the display 130 of FIG. 3) and a sensor 240 (e.g., the sensor 190 of FIG. 3). As another example, the display module 200 may include panels or layers 210, 220, and 230, and the sensor 240 may be coupled to the display module 200.

In the illustrated embodiment, the display module 200 may include a first panel 210 including a plurality of pixels 213, a cover layer 230 disposed on a first surface 211 (e.g., +z-axis direction) of the first panel 210, and a second panel 220 disposed on a second surface 212 (e.g., −z-axis direction) of the first panel 210. For example, the sensor 240 may be coupled to the first panel 210. The first panel 210 may be disposed between the second panel 220 and the cover layer 230.

In the illustrated embodiment, the first panel 210 may include the first surface 211 facing a first direction (e.g., the +z-axis direction) and the second surface 212 facing a second direction (e.g., the −z-axis direction) that is opposite to the first direction. The first direction may be, for example, a direction toward the front surface of the electronic device 100 (e.g., a direction toward the first plate 120 in FIG. 3), and the second direction may be, for example, a direction toward the rear surface (e.g., a direction toward the second plate 180 in FIG. 3).

In the illustrated embodiment, the cover layer 230 may form at least a portion of the first plate (e.g., the first plate 120 of FIG. 3), or at least a portion of the cover layer 230 may form a first surface (e.g., the first surface 110A of FIG. 1) of a housing (e.g., the housing 110 of FIG. 1) or a surface of the electronic device 100.

In various embodiments, the cover layer 230 may be formed to be transparent. The cover layer 230 may include a transparent material. In various embodiments, the cover layer 230 may be made of various materials. For example, the cover layer 230 may be made of glass or a polymer (e.g., polymide (PI) or polyethylene terephthalate (PET)).

In various embodiments, a screen display area 201 may be formed on the cover layer 230 by the first panel 210 disposed in the second direction (e.g., the −z-axis direction) of the cover layer 230. A sensing area 202 may be formed on the cover layer 230 by the sensor 240. For example, the sensing area 202 and the screen display area 201 may be formed to at least partially overlap each other.

In various embodiments, the sensor 240 may transmit/receive a signal (e.g., an optical signal or an ultrasonic signal). The signal may pass from the sensor 240 to the sensing area 202 to travel toward a portion of a user's body (e.g., a fingerprint of a finger), and the signal reflected by the portion of the user's body may pass again through the sensing area 202 to travel to the sensor 240.

In the illustrated embodiment, the first panel 210 may include a pixel layer including a plurality of pixels 213. The pixel layer may form the screen display area 201 on the first plate (e.g., the first plate 120 of FIG. 3) (or the front surface of the electronic device 100). In various embodiments, the first panel 210 may include a touch layer (not shown) including a plurality of touch sensors.

In the illustrated embodiment, the second panel 220 may include a buffer layer 221 for supporting the first panel 210 and a shielding layer 222 for shielding noise generated from the display module 200 from other electronic elements (e.g., electronic elements disposed on the printed circuit board). According to an embodiment, the shielding layer 222 may be a copper sheet (Cu sheet).

In various embodiments, the buffer layer 221 may include layers for buffering an impact applied to the first panel 210. For example, the buffer layer 221 may include a light blocking layer (e.g., a black layer including an uneven pattern). For example, the light blocking layer may refer to a layer including a layer on which an uneven pattern (e.g., an embossing pattern) is formed and a black layer. The buffer layer 221 may include a buffer material for absorbing the impact.

In various embodiments, the second panel 220 may further include a heat dissipation layer 223 for dissipating heat from the display module 200. In various embodiments, the heat dissipation layer 223 may include a graphite material.

In various embodiments, the display module 200 may further include a protection film (PF) (not shown). For example, the protection film may be disposed between the first panel 210 and the second panel 220 to protect the first panel 210. As another example, the protection film may be included in the first panel 210.

In the second panel 220 illustrated in FIG. 4, the buffer layer 221 may be disposed on the first panel 210, the shielding layer 222 may be disposed on the buffer layer 221, and the heat dissipation layer 223 may be disposed on the shielding layer 222, but are not limited thereto. For example, the second panel 220 disclosed in the present disclosure may be stacked in an order that is different from the layers 221, 222, and 223 illustrated in FIG. 4 or may further include an additional layer, or some layers may be omitted.

In the illustrated embodiment, the display module 200 may include an opening 225 passing through the second panel 220. For example, the opening 225 may have a shape of a rectangle, a square, a circle, an oval, or the like when the display module 200 is viewed in the +z-axis direction. As another example, the opening 225 may have a shape corresponding to a combination of various shapes. According to an embodiment, the opening 225 may pass through the second panel 220 when viewed in the second direction (e.g., the −z-axis direction). For example, the second surface 212 may be directly exposed through the opening 225. As another example, the second surface 212 may be visually exposed through the opening 225 and the protection film (not shown). As another example, the protection film may be exposed through the opening 225. In this case, at least a portion of the sensor 240 may be disposed inside the opening 225. For example, the opening 225 may have a size larger than that of the sensor 240 so that an inner wall 2252 is spaced a specified interval d from a side surface 243 of at least a portion of the sensor 240 mounted in the opening 225. The shape of the sensor 240 illustrated in FIG. is merely an example, and embodiments of the present disclosure are not limited thereto. For example, only a portion of the sensor 240 may be mounted in the opening 225, and the remaining portion of the sensor 240 may protrude from the opening 225. The size of the remaining portion of the sensor 240 protruding from the opening 225 may be larger than that of the opening 225.

In the illustrated embodiment, the opening 225 may include a bottom surface 2251 and inner walls 2252 facing each other. The bottom surface 2251 may include a portion of the second surface 212 of the first panel 210. The inner walls 2252 may include end surfaces of a plurality of layers (e.g., 221, 222, and 223) included in the second panel 220.

In the illustrated embodiment, the sensor 240 includes a first surface 241 disposed to face the first panel 210, a second surface 242 opposite to the first surface 241, and side surfaces 243 formed between the surface 241 and the second surface 242.

In various embodiments, the sensor 240 may be inserted into the opening 225 so that the first surface 241 is attached to the bottom surface 2251 of the opening 225, and the side surface 243 is spaced the predetermined interval d from the inner wall 2252 of the opening 225.

Hereinafter, the sensor 240 disclosed in various embodiments of the present disclosure may include an ultrasonic sensor. The ultrasonic sensor may be configured to acquire user's biometric information (e.g., a structure of the fingerprint) using ultrasonic waves having a predetermined frequency. As the frequency of the ultrasonic waves increases, resolution of the ultrasonic sensor may be improved.

In various embodiments, the ultrasonic sensor may transmit ultrasonic waves toward the portion of the user's body, which is adjacent to (e.g., in contact with) the sensing area 202 (e.g., the sensing area 110F of FIG. 1) formed on the cover layer 230 and may receive the ultrasonic waves reflected by the portion of the user's body to acquire the user's biometric information. For example, the sensor 240 may be an ultrasonic fingerprint sensor for acquiring user's fingerprint information, and the biometric information may correspond to the user's fingerprint.

Figure 5:
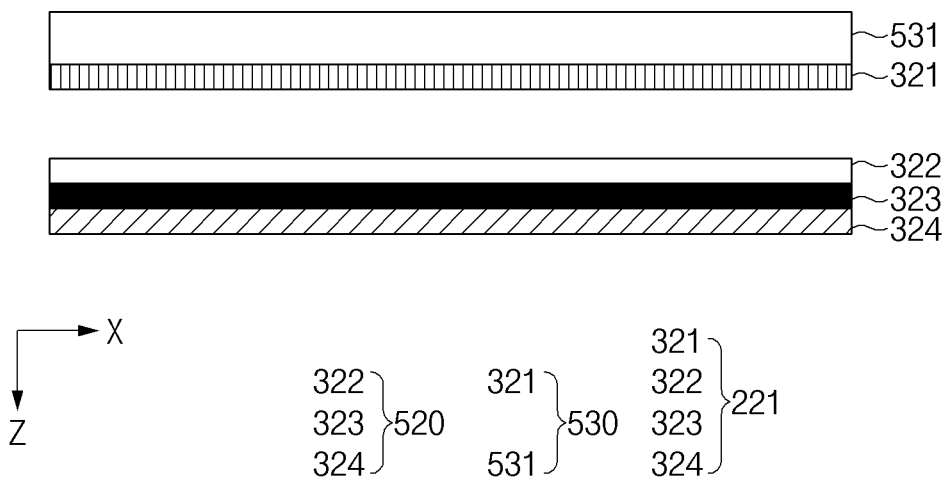
FIG. 5 is a diagram illustrating an example layer structure of a second panel according to various embodiments.

FIG. 5 is a diagram illustrating an example layer structure of the second panel according to various embodiments.

According to various embodiments, as described above with reference to FIG. 4, the display module (e.g., the display module 200 of FIG. 4) may include a first panel (e.g., the first panel 210 of FIG. 4) including a plurality of light emitting elements and a second panel (e.g., the second panel 220 of FIG. 4) providing the optical and/or electrical shielding for the first panel. In the following descriptions, the second panel 220 may include a first layer 520 and a second layer 530.

According to an embodiment, the first layer 520 may refer, for example, to at least one layer of the second panel 220 that provides the optical shielding for the first panel 210. For example, the first layer 520 may be a black emboss layer. The first layer 520 may include an embossing pattern on at least one surface and may prevent and/or reduce light or moisture from being introduced into the first panel 210. The first layer 520 may include an adhesive layer 324, a black layer 323, and a polymer layer 322. For example, the polymer layer 322 may be made of PI or PET.

For example, the adhesive layer 324 may be a double-sided adhesive member for allowing the first panel 210 and the second panel 220 to adhere to each other. In order to prevent and/or reduce formation of air bubbles, an adhesive material may be applied to a surface of the adhesive layer 324 facing the first panel 210 (e.g., a surface in the +z direction) in an uneven shape. The adhesive layer 324 may be disposed between the first panel 210 and the black layer 323.

For example, the black layer 323 may be disposed between the adhesive layer 324 and the polymer layer 322. The black layer 323 may be made of a black material (e.g., ink, etc.) to prevent and/or reduce external light from being introduced into the first panel 210 through the second panel 220.

For example, the polymer layer 322 may be a layer for maintaining the uneven pattern (e.g., the embossing pattern) of the first layer 520. The polymer layer 322 may be disposed between the black layer 323 and the second layer 530. The uneven pattern of the polymer layer 322 may prevent and/or reduce bubbles from being generated when the first layer 520 and the second layer 530 are attached.

According to an embodiment, the second layer 530 may be a layer for the electrical shielding and/or the heat dissipation of the display module. For example, the second layer 530 may include a buffer member 321 and a rear layer 531. The second layer 530 may be attached to the first layer 520 and an opposite surface of the surface of the first layer 520, on which the first panel 210 is attached.

For example, the buffer member 321 may be an impact absorbing member for absorbing an impact. The first layer 520 and the buffer member 321 may include at least a portion of the buffer layer 221 of FIG. 4. For example, the rear layer 531 may correspond to the shielding layer 222 and/or the heat dissipation layer 223 of FIG. 4.

Hereinafter, methods for mounting the sensor may be described based on the first layer 520 and the second layer 530. The configuration of the first layer 520 and the second layer 530 illustrated in FIG. 5 is merely an example, and thus embodiments of the present disclosure are not limited thereto. For example, the first layer 520 may be a layer including at least layers between the light shielding layer (e.g., the black layer 323) and the first panel 210.

After attaching the first layer 520 and the second layer 530 of FIG. 5, an opening may be formed in at least some layers, and when a sensor (e.g., the sensor 240 of FIG. 4) is attached to the rear surface of the first panel 210 through the opening, the opening may have a tolerance due to thicknesses of the first layer 520 and the second layer 530. In addition, when a gap between the sensor 240 and the second layer 530 is too narrow, electrical characteristics of the sensor 240 may be affected by the second layer 530 (e.g., the shielding layer 222). Hereinafter, the methods for mounting the sensor 240 on the rear side of the first panel 210 may be described in greater detail below with reference to FIGS. 6, 7, 8, 9, 10, 11, 12, 13 and 14.

Figure 6:
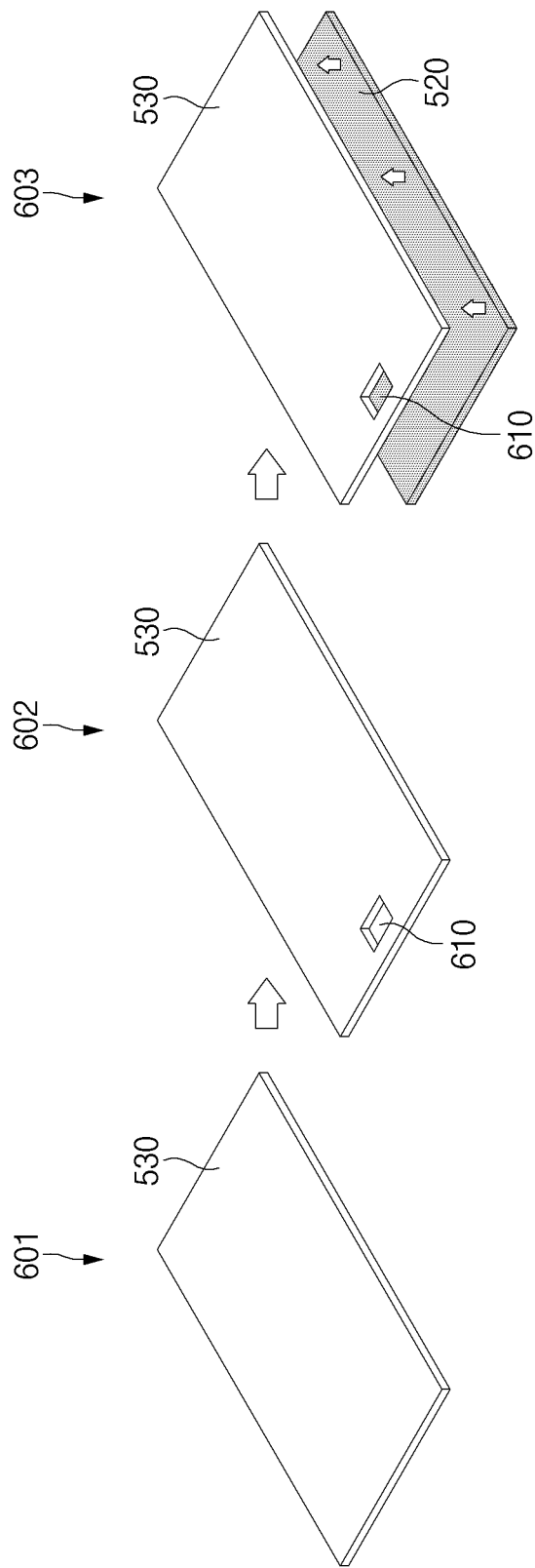
FIG. 6 is a diagram illustrating formation of a first opening according to various embodiments.

FIG. 6 is a diagram illustrating example formation of a first opening according to various embodiments.

Referring to reference numerals 601 and 602 of FIG. 6, according to an embodiment, a second opening 610 may be formed in the second layer 530. For example, the second opening 610 may be disposed at a lower end of a center of the second layer 530. The second opening 610 may include an area corresponding to the sensing area (e.g., the sensing area 110F of FIG. 1) of the first panel (e.g., the first panel 210 of FIG. 4). For example, the second opening 610 may be set to have at least a first offset on at least one surface of a mounting area of a sensor (e.g., the sensor 240 of FIG. 4). As another example, the opening 610 may have substantially the same size as the mounting area of the sensor 240.

Referring to reference numeral 603 of FIG. 6, according to an embodiment, the first layer 520 may be attached to one surface of the second layer 530.

Figure 7:
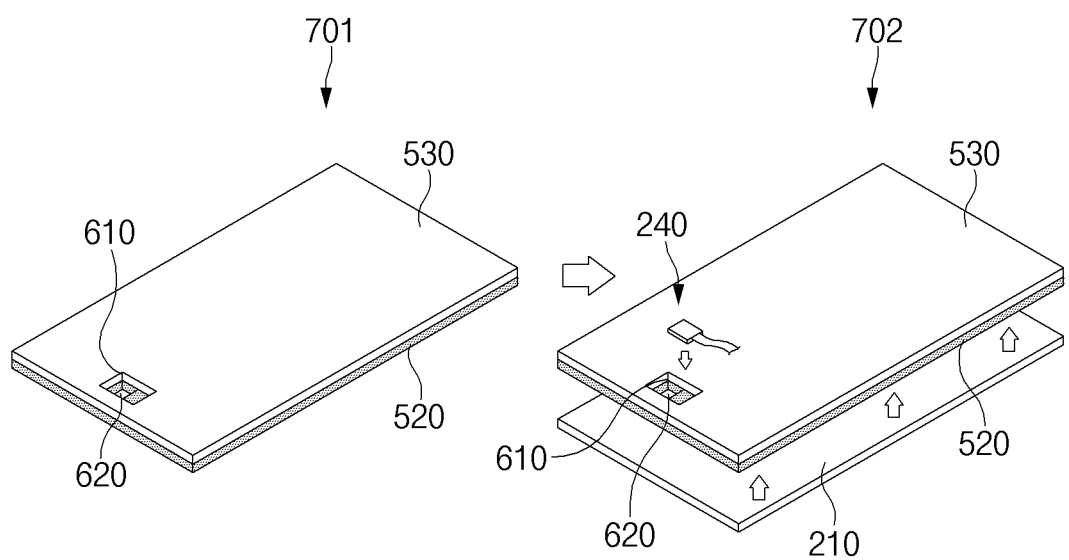
FIG. 7 is a diagram illustrating formation of a second opening according to various embodiments.

FIG. 7 is a diagram illustrating example formation of a second opening according to various embodiments.

Referring to reference numeral 701 of FIG. 7, according to an embodiment, after attaching the first layer 520 and the second layer 530, the first opening 620 may be formed in the first layer 520. For example, the first opening 620 may be smaller than the second opening 610. The first opening 620 may be set to have at least a second offset on four surfaces of the mounting area of the sensor 240. The second offset may be less than the first offset of the second opening 610. For example, the first opening 620 may be formed by punching the first layer 520 through the second opening 610.

Referring to reference numeral 702 of FIG. 7, according to an embodiment, after the first opening 620 is formed, the first panel 210 may be attached to the first layer 520. The sensor 240 may be attached to the first panel 210 through the first opening 620.

The method for forming the second opening 610 and the first opening 620 described above with reference to FIGS. 6 and 7 is merely an example, and thus embodiments of the present disclosure are not limited thereto. According to an embodiment, after each of the second opening 610 and the first opening 620 is formed, the first layer 520 and the second layer 530 may be coupled to each other. For example, after the first layer 520 and the first panel 210 are coupled to each other, the second layer 530 and the first layer 520 may be coupled to each other. As another example, after the first layer 520 and the second layer 530 are coupled to each other, the first layer 520 and the first panel 210 may be coupled to each other. According to an embodiment, the second panel 220 may be coupled to the first panel 210 in a state in which the sensor 240 is attached to the first panel 210. For example, the first panel 210 may further include a means (e.g., an air gap or a transparent material) for guiding a gap between the mounting area of the sensor 240 and the first opening 620.

Figure 8:
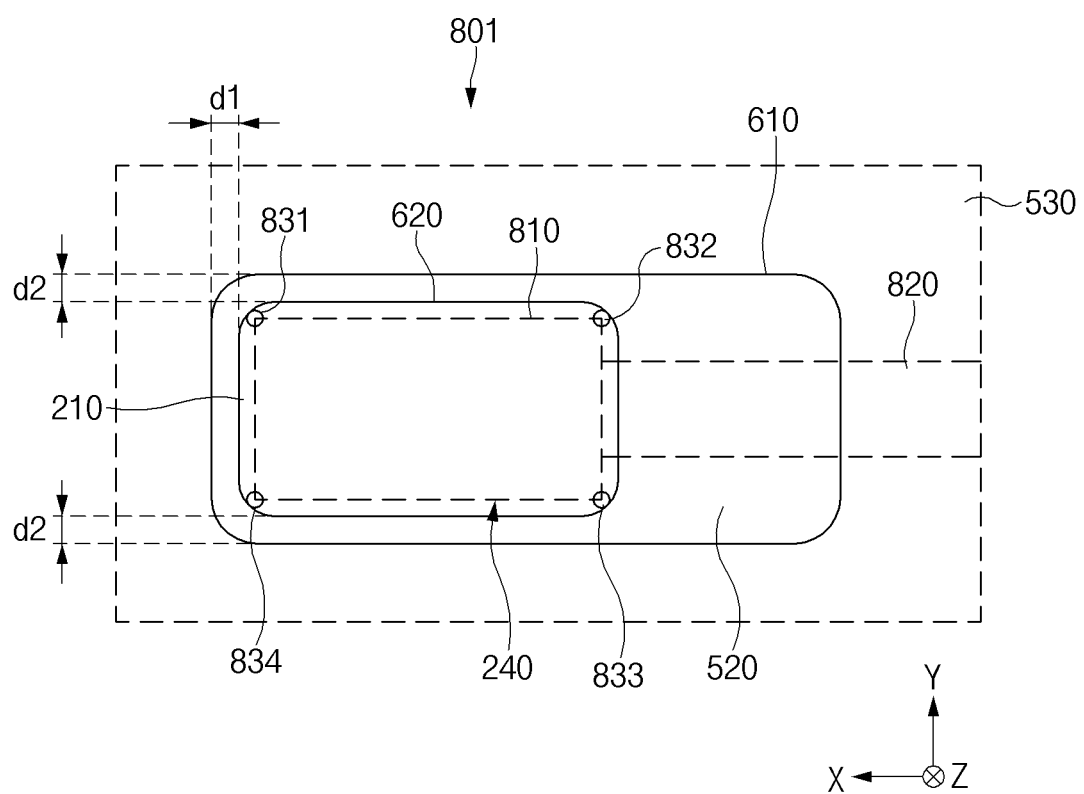
FIG. 8 is a diagram illustrating an example sensor mounting structure according to various embodiments.

FIG. 8 is a diagram illustrating an example sensor mounting structure 801 according to various embodiments.

In FIG. 8, a structure in which the sensor 240 is mounted according to FIGS. 6 and 7 is illustrated. The sensor 240 may be indicated by a dotted line. For example, the sensor 240 may include a sensor part 810 and a flexible printed circuit board (FPCB) 820. The sensor part 810 may be attached to the first panel 210 through adhesive points 831, 832, 833, and 834. The adhesive points 831, 832, 833, and 834 may be cured when infrared rays are irradiated to fix the sensor 240 to the first panel 210. Thereafter, the sensor 240 may be attached to the first panel 210 using an adhesive material (not shown) and a pressing process.

Considering the adhesive points 831, 832, 833, and 834 and a punching tolerance, the first opening 620 may have an offset (e.g., a second offset) on at least a portion of the four surfaces of the mounting area (e.g., the sensor part 810) of the sensor 240. The second opening 610 may have offsets (e.g., d1 and d2) on the four surfaces of the first opening 620. For example, the offset d1 may be about 0.3 mm. For example, the offset d2 may be about 0.3 mm. The above-described values of the offsets d1 and d2 are merely an example, and thus embodiments of the present disclosure are not limited thereto. As described above with reference to FIGS. 6 and 7, since the first opening 620 is formed through the second opening 610, only the first layer 520 may be formed through punching. For example, compared to the punching of the first layer 520 and the second layer 530 at the same time, relatively accurate punching may be performed.

According to an embodiment, the second opening 610 may be formed to further include an offset on a slope of the first opening 620. For example, the second opening 610 further includes a third offset (e.g., about 0.3 mm) with respect to three surfaces of the first opening 620 and a fourth offset with respect to the remaining one surface of the first opening 620. The fourth offset may be greater than the third offset. As illustrated in FIG. 8, the second opening 610 may further extend to one side (e.g., the −x-axis direction) when compared to the first opening 620. For example, the first opening 620 may be formed in the first layer 520 within the second opening 610, be aligned with a center of a short axis (e.g., y-axis) of the second opening 610, and be aligned to be biased in the first direction from a center of a long axis (e.g., x-axis) of the second opening 610. For example, the first direction may be a direction (e.g., +x direction) opposite to a direction in which the FPCB 820 extends from the sensor part 810 (e.g., −x direction). The numerical values of the above-described offsets are merely an example, and thus embodiments of the present disclosure are not limited thereto. For example, at least some of the values of the offsets described above may be different from those of the remaining offsets.

Since the second opening 610 is larger than the first opening 620, a stepped portion on the x-axis that affects the FPCB 820 may be formed in stages. On the other hand, when the first layer 520 and the second layer 530 are punched together to form the second opening 610, the stepped portion corresponding to the thickness of the first layer 520 and the second layer 530 may be applied to the FPCB 820. In this case, the FPCB 820 may be bent due to the stepped portion. Thus, the stepped portion may be formed in stages to prevent and/or reduce the FPCB 820 from being bent.

The first opening 620 that is relatively smaller than the second opening 610 may be formed in the first layer 520 to reduce the gap between the mounting area (e.g., sensor part 810) of the sensor 240 and the first opening 620. Since the first layer 520 has a light shielding function, an introduction of external light through the first opening 620 may be reduced. Due to the reduction of the gap, external visibility of the sensor 240 may be reduced.

Figure 9:
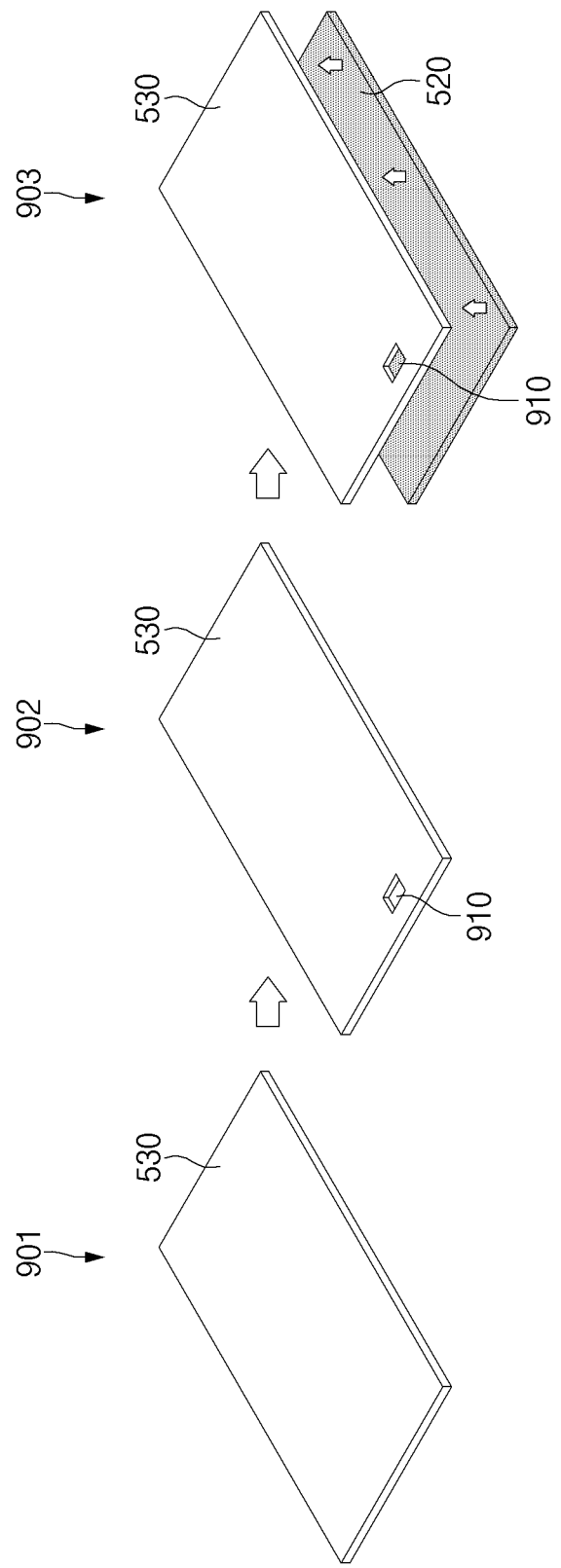
FIG. 9 is a diagram illustrating example formation of a first opening according to various embodiments.

FIG. 9 is a diagram illustrating example formation of the first opening according to various embodiments.

An example in which the first opening 620 is formed in the second opening 610 has been described with reference to FIGS. 6 and 7, but embodiments of the present disclosure are not limited thereto. For example, as will be described in greater detail below with reference to FIGS. 9 and 10, after the second opening 910 is formed, the second layer 530 and the first layer 520 are punched together to form the first opening 920. In this case, at least a portion of the first opening 920 and the second opening 910 may not overlap each other.

Referring to reference numerals 901 and 902 of FIG. 9, according to an embodiment, the second opening 910 may be formed in the second layer 530. For example, the second opening 910 may be set to have an offset on one surface of the mounting area of the sensor (e.g., the sensor 240 of FIG. 4). For example, the second opening 910 may be an area on which the FPCB of the sensor is to be mounted (e.g., an offset area formed on one surface of the sensor mounting area).

Referring to reference numeral 903 of FIG. 9, according to an embodiment, after the second opening 910 is formed, the first layer 520 may be attached to one surface of the second layer 530.

Figure 10:
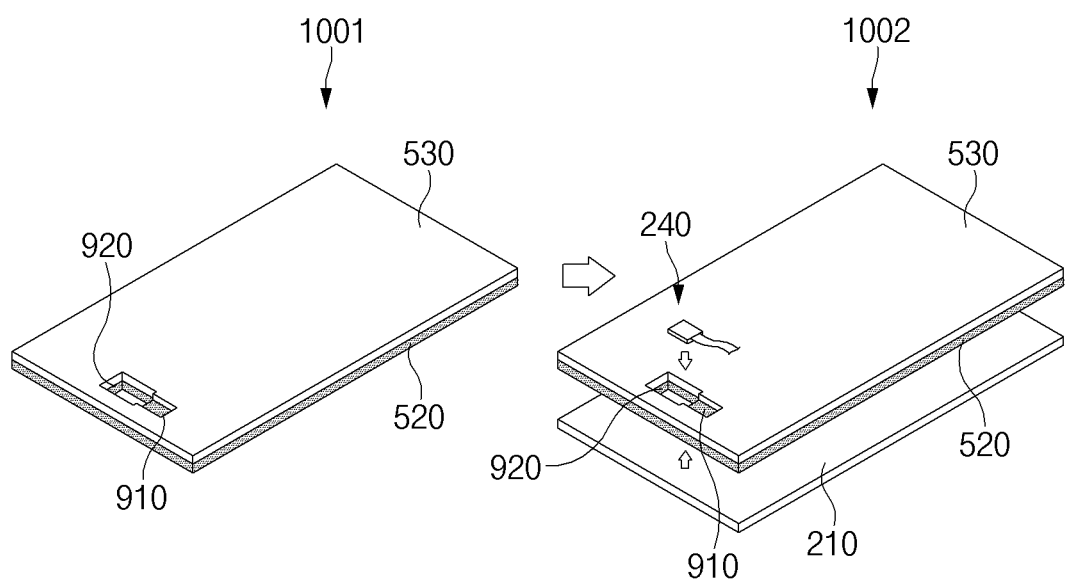
FIG. 10 is a diagram illustrating example formation of a second opening according to various embodiments.

FIG. 10 is a diagram illustrating example formation of the second opening according to various embodiments.

Referring to reference numeral 1001 of FIG. 10, according to an embodiment, after attaching the first layer 520 and the second layer 530, the first opening 920 may be formed in the first layer 520 and the second layer 530.

According to an embodiment, the first opening 920 may be larger than the second opening 910. For example, a long axis of the first opening 920 may be longer than that of the second opening 910. For example, a short axis of the first opening 920 may be longer than that of the second opening 910. For example, the long axis of the first opening 920 may be longer than that of the second opening 910, and the short axis of the first opening 920 may be longer than that of the second opening 910.

According to an embodiment, the first opening 920 may be formed to overlap a portion of the second opening 910. For example, the remaining area of the second opening 910, which does not overlap the first opening 920, may form a shielding area by the first layer 520. For example, the first opening 920 may be formed by punching a partial area of the first layer 520 corresponding to a portion of the second opening 910 and areas of the first layer 520 and the second layer 530, which are continuous to a portion of the second opening 910.

Referring to reference numeral 1002 of FIG. 10, according to an embodiment, after the first opening 920 is formed, the first panel 210 may be attached to the first layer 520. The sensor 240 may be attached to the first panel 210 through the first opening 920.

The shapes of the second opening 910 and the first opening 920 described above with reference to FIG. 10 are merely an example, and thus embodiments of the present disclosure are not limited thereto. For example, the second opening may have a square, oval, or circular shape.

Figure 11:
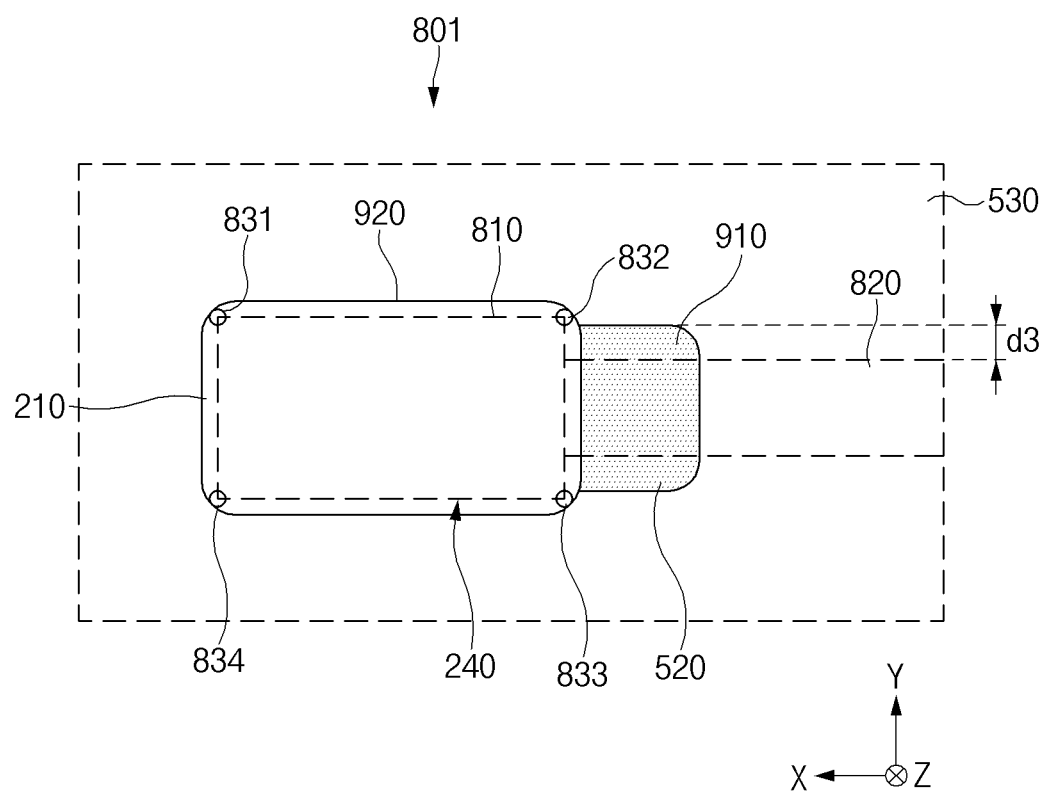
FIG. 11 is a diagram illustrating an example sensor mounting structure according to various embodiments.

FIG. 11 is a diagram illustrating an example sensor mounting structure according to various embodiments.

In FIG. 11, a structure in which the sensor 240 is mounted according to FIGS. 9 and 10 is illustrated. The sensor 240 may be indicated by a dotted line. For example, the sensor 240 may include a sensor part 810 and a flexible printed circuit board (FPCB) 820. The sensor part 810 may be attached to the first panel 210 through adhesive points 831, 832, 833, and 834. The adhesive points 831, 832, 833, and 834 may be cured when infrared rays are irradiated to fix the sensor 240 to the first panel 210. Thereafter, the sensor 240 may be attached to the first panel 210 using an adhesive material (not shown) and a pressing process.

Considering the adhesive points 831, 832, 833, and 834 and the punching tolerance, the first opening 920 may have offsets (e.g., offsets d1 and d2 as illustrated in FIG. 8) on the four surfaces of the mounting area (e.g., the sensor part 810) of the sensor 240. For example, each of the offsets d1 and d2 may be about 0.7 mm.

According to an embodiment, the first layer 520 exposed through the first opening 920 may have a thick thickness on an x-y plane when compared to the FPCB 820. For example, the offset d3 of the first opening 920 with respect to one side of the FPCB 820 may be about 0.7 mm.

Since the second opening 910 is formed to protrude from the first opening 920 in the extending direction of the FPCB 820, a stepped portion on the x-axis that affects FPCB 820 may be formed in stages. The stepped portion may be formed in stages to prevent and/or reduce the FPCB 820 from being bent. The FPCB 820 may be prevented and/or reduced from being bent, and thus, the offset of the first opening 920 with respect to the surface of the mounting area (e.g., the sensor part 810) of the sensor in the extension direction of the FPCB 820 may be reduced. Accordingly, a gap between the mounting area of the sensor 240 and the first opening 920 may be reduced. Since the first layer 520 has a light shielding function, an introduction of external light through the first opening 920 may be reduced. Due to the reduction of the gap, external visibility of the sensor 240 may be reduced.

Since the second opening 910 is formed to protrude from the first opening 920 in the extending direction of the FPCB 820, an interference of the second layer 530 with the FPCB 820 may be reduced. For example, an electrical influence on the FPCB 820 by the conductive layer (e.g., the shielding layer 222 (e.g., the shielding layer 222 of FIG. 4) (e.g., the copper sheet) of the second layer 530 may be reduced.

In FIG. 11, the first opening 920 is illustrated as protruding from the short axis of the second opening 910, but embodiments of the present disclosure are not limited thereto. For example, the second opening 910 may protrude from the long axis of the first opening 920 to extend. For example, the second opening 910 may extend in the +Y direction or the −Y direction from the long axis of the first opening 920.

Figure 12:
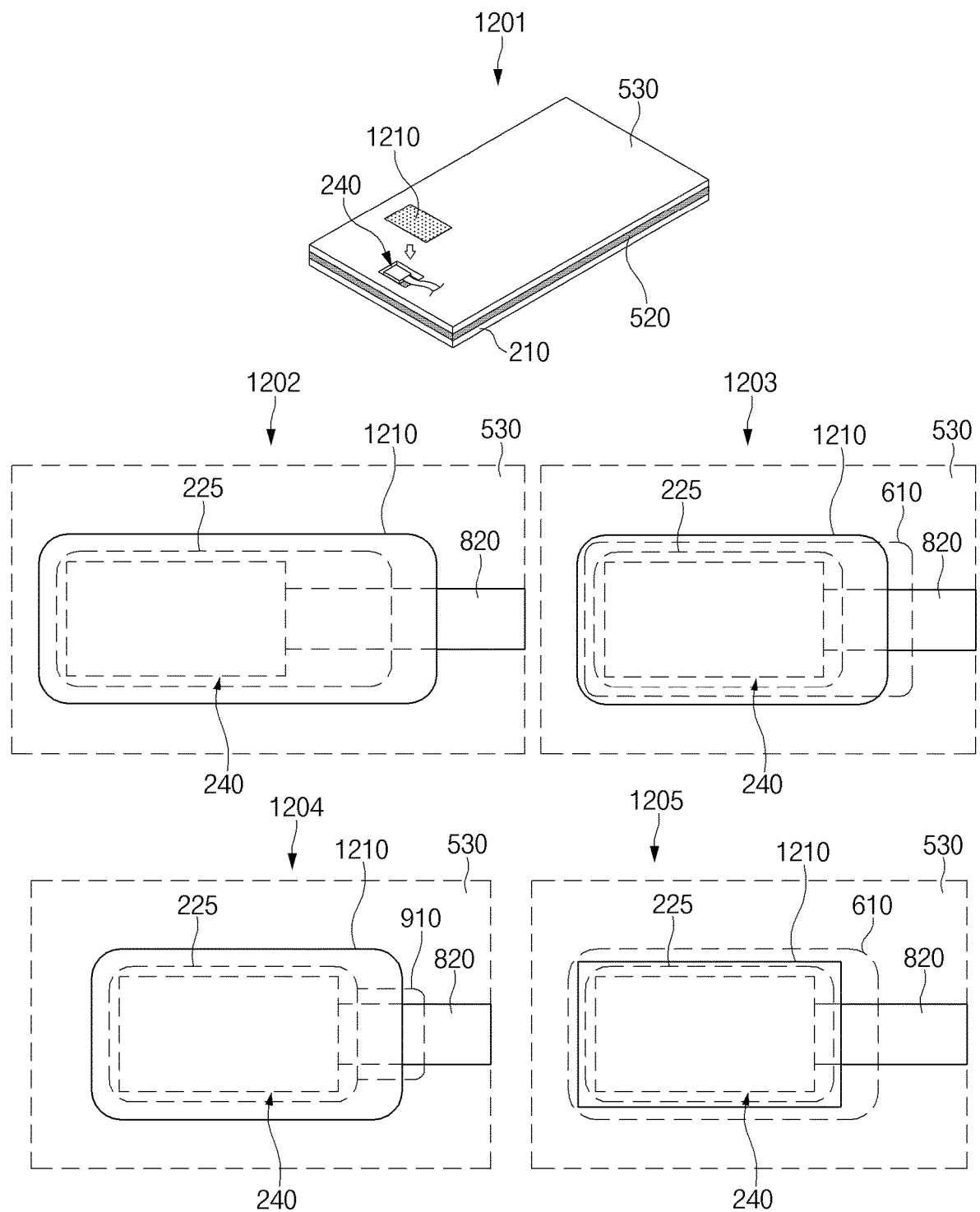
FIG. 12 is a diagram illustrating an additional structure including a shielding member according to various embodiments.

FIG. 12 is a diagram, illustrating example additional structures of a shielding member according to various embodiments.

Referring to FIG. 12, according to an embodiment, a shielding member 1210 (e.g., a black tape) that is capable of covering at least a portion of the opening 225 (e.g., an opening area corresponding to a common area of the first opening (reference numeral 610 of FIG. 6 or reference numeral 910 of FIG. 9) and the second opening (reference numeral 620 of FIG. 6 or reference numeral 920 of FIG. 9) may be added.

For example, as illustrated by reference numeral 1201, the shielding member 1210 may be attached to the second layer 530 to cover the opening 225 after the sensor 240 is mounted.

For example, as illustrated by reference numeral 1202, the shielding member 1210 may be larger than at least the opening 225. When the shielding member 1210 is used to block external light, the opening 225 may be formed by punching the first layer 520 and the second layer 530 at once. The shape of the opening 225 of FIG. 12 is merely an example, and thus embodiments of the present disclosure are not limited thereto. For example, the shielding member 1210 may be applied in the same principle to the above-described types of openings described above with reference to FIGS. 6 to 11.

For example, as illustrated by reference numeral 1203, the shielding member 1210 may be larger than at least the opening 225 (e.g., the first opening 620 of FIG. 7). For example, the shielding member 1210 may cover at least a portion of the second opening 610 of FIG. 6. As another example, the shielding member 1210 may extend to cover the entire second opening 610. As another example, the shielding member 1210 may be formed to cover only the opening 225. In this case, the shielding member 1210 may be larger than the opening 225 and smaller than the second opening 610.

For example, as illustrated by reference numeral 1204, the shielding member 1210 may be larger than at least the opening 225 (e.g., the first opening 920 of FIG. 10). For example, the shielding member 1210 may cover at least a portion of the second opening 910 of FIG. 10. As another example, the shielding member 1210 may extend to cover the entire second opening 910.

For example, as illustrated by reference numeral 1205, the shielding member 1210 may be larger than at least the opening 225 (e.g., the first opening 620 of FIG. 7). For example, the shielding member 1210 may be larger than the opening 620 of FIG. 7 and smaller than the second opening 610.

The shape of the shielding member 1210 illustrated in FIG. 12 is merely an example, and embodiments of the present disclosure are not limited thereto. For example, the shielding member 1210 may have a loop shape formed to shield a gap between the opening 250 and the sensor 240. As another example, the shielding member 1210 may be formed to shield only a portion of the opening 250.

Figure 13:
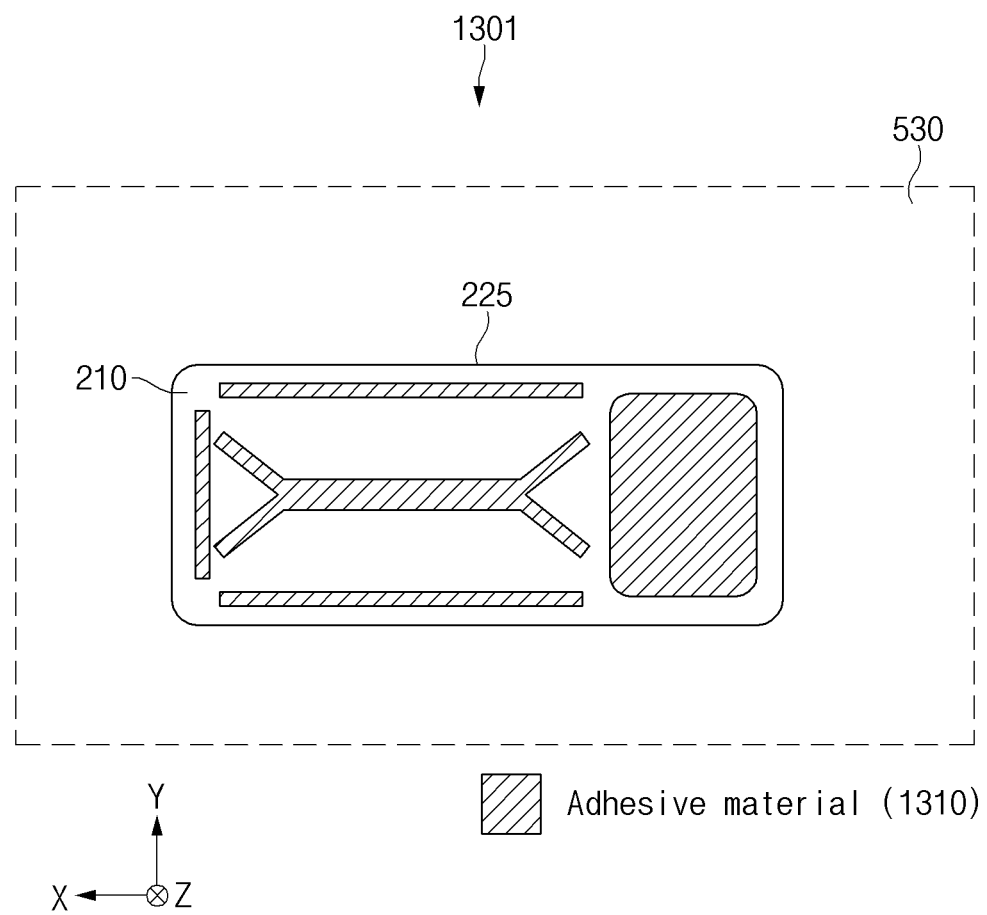
FIG. 13 is a diagram illustrating an example adhesive material pattern according to various embodiments.

FIG. 13 is a diagram illustrating an example adhesive material pattern according to various embodiments.

As illustrated by reference numeral 1301, according to an embodiment, an adhesive material 1310 may be used to shield external light. For example, one opening 225 may be formed after the first layer 520 and the second layer 530 adhere to each other. In this case, the adhesive material 1310 for attaching the sensor (e.g., the sensor 240 of FIG. 4) to the first panel 210 through the opening 225 may be applied in a designated pattern. For example, the adhesive material 1310 may be a non-permeable adhesive material (e.g., black resin). The adhesive material 1310 may be applied over the entire opening 225 to prevent and/or reduce external light from being transmitted.

Figure 14:
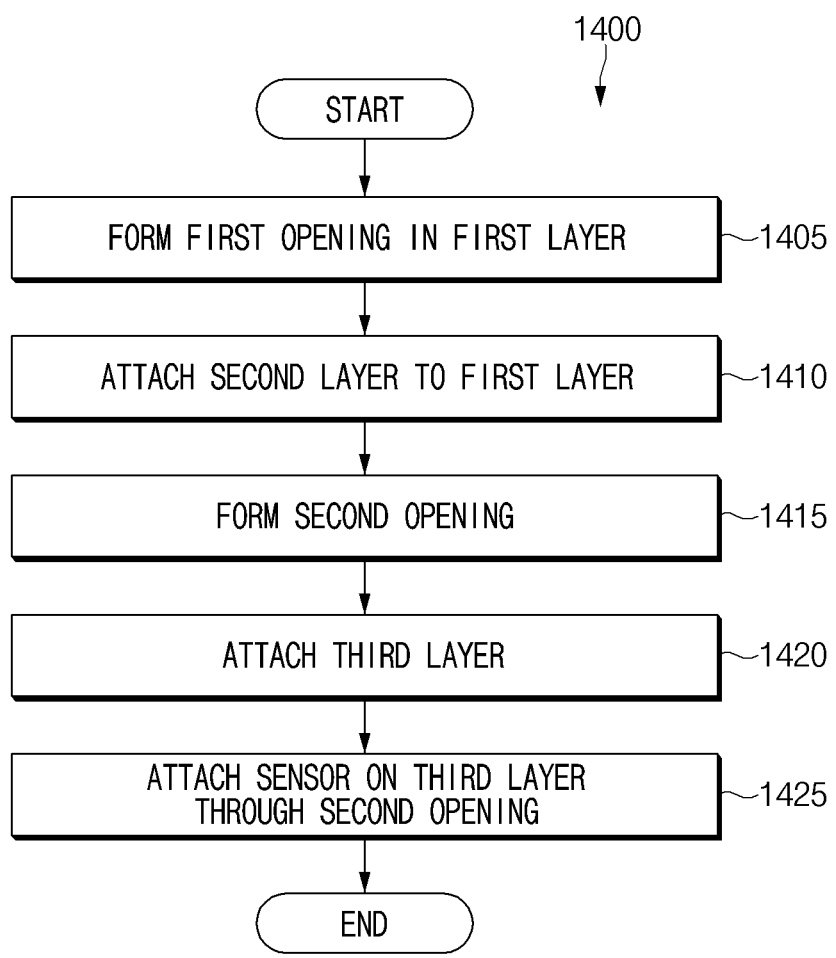
FIG. 14 is a flowchart illustrating an example sensor mounting method according various embodiments.

FIG. 14 is a flowchart illustrating an example sensor mounting method 1400 according to various embodiments.

According to various embodiments, the sensor mounting method 1400 may include an operation (e.g., operation 1405) of forming a first opening (e.g., the first opening 620 of FIG. 6 or the first opening 920 of FIG. 9) in a second layer (e.g., the second layer 530 of FIG. 5). For example, the first opening may be formed by punching the second layer in a designated shape.

According to various embodiments, the sensor mounting method 1400 may include an operation (e.g., operation 1410) of attaching the first layer (e.g., the first layer 520 of FIG. 5) to the second layer.

According to various embodiments, the sensor mounting method 1400 may include an operation (e.g., operation 1415) of forming a second opening (e.g., the second opening 610 of FIG. 7 or the second opening 910 of FIG. 10). For example, the second opening (e.g., the second opening 610 of FIG. 7) may be formed by punching the first layer in a designated shape through the first opening. As another example, the second opening (e.g., the second opening 910 of FIG. 10) may be formed by punching the first layer and the second layer in a designated shape.

According to various embodiments, the sensor mounting method 1400 may include an operation (e.g., operation 1420) of attaching a third layer (e.g., the first panel 210 of FIG. 4) on the first layer. For example, the third layer may be attached to a second surface of the first layer that is opposite to the first surface of the first layer to which the first layer and the second layer adhere.

According to various embodiments, the sensor mounting method 1400 may include an operation (e.g., operation 1425) of attaching a sensor (e.g., the sensor 240 of FIG. 4) on the third layer through the second opening. For example, the operation of attaching the sensor may include an operation of applying a thermosetting resin to at least a portion within the second opening, an operation of attaching a sensor 240 to the thermosetting resin, an operation of injecting an ultraviolet curable adhesive into a corner of a second part (e.g., the sensor part 810 of FIG. 8) of the sensor 240, an operation of irradiating ultraviolet rays to cure the adhesive, an operation loading a display, to which the sensor 240 is attached, to allow the chamber to increase in pressure so as to remove bubbles of the thermosetting resin, and an operation of unloading the display from the chamber to thermally cure the thermosetting resin.

According to an embodiment, the sensor mounting method 1400 may further include an operation of allowing a non-transmissive adhesive member (e.g., the shielding member 1210 of FIG. 12) to adhere to the second layer 530 so as to cover the first opening.

The sensor mounting method 1400 described above with reference to FIG. 14 is merely an example, and thus embodiments of the present disclosure are not limited thereto. For example, the operation 1415 may be performed before the operation 1410. As another example, the attachment of the sensor (e.g., operation 1425) may be performed before the attachment of the third layer (e.g., operation 1420).

Figure 15:
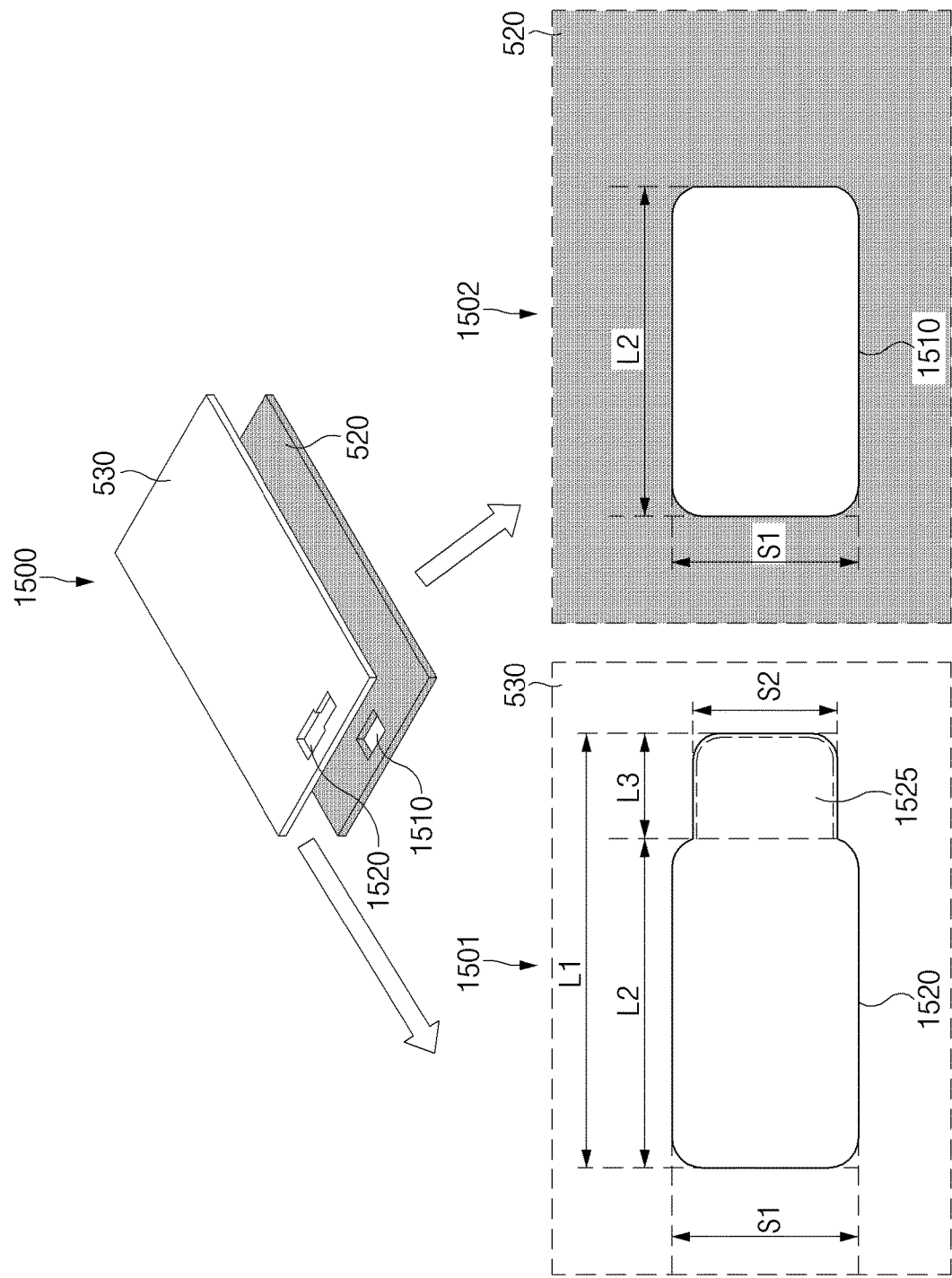
FIG. 15 is a diagram illustrating an example shape of an opening according to various embodiments.

FIG. 15 is a diagram illustrating an example shape of an opening according to various embodiments.

In FIG. 15, the first layer 520 and the second layer 530 may include openings formed through the process of reference numerals 901, 902, and 903 of FIG. 9, and reference numeral 1001 of FIG. 10. Referring to reference numeral 1500, the first layer 520 may include a third opening 1510 formed in the process of forming the second opening (e.g., the first opening 920 of FIG. 10). The second layer 530 may include a fourth opening 1520 formed in the process of forming the first opening (e.g., the first opening 920 of FIG. 10) and the first opening (e.g., the second opening of FIG. 10).

Referring to reference numeral 1501, the second layer 530 may include the fourth opening 1520. For example, the fourth opening 1520 may include a long axis having a length L1 and a short axis having a length S1. The fourth opening 1520 may include a protrusion 1525 extending to one side of the fourth opening 1520. For example, the protrusion 1525 may extend in a direction in which the FPCB of the sensor extends from the sensor when the sensor (e.g., the sensor 240 of FIG. 4) is mounted. For example, the protrusion may have a length L3 and a height S2. A remaining area (an area having the length L2 and the height S1) of the fourth opening 1520 excluding the protrusion 1525 may be larger than the mounting area of the sensor (e.g., the sensor part 810 of FIG. 8).

For example, the second layer 530 may include a layer (e.g., a copper sheet) that provides electrical shielding. The protrusion 1525 may reduce electrical interference and physical interference of the sensor with respect to the FPCB when the sensor is mounted.

Referring to reference numeral 1502, the first layer 520 may include a third opening 1510. For example, the third opening 1510 may include a long axis having a length L2 and a short axis having a length S1. Since the third opening 1510 does not include the protrusion 1525, after the first layer 520 and the second layer 530 are attached, a portion of the first layer 520 may be exposed through the protrusion 1525 of the second layer 530. The third opening 1510 may correspond to an area on which the sensor is attached to the display panel (e.g., the first panel 210 of FIG. 4).

According to various example embodiments, the electronic device (e.g., the electronic device 100 of FIG. 1) may include a housing (e.g., the housing 110 of FIG. 1), a display module (e.g., the display 101 of FIG. 1), and a sensor (e.g., the sensor 240 of FIG. 4). The display module may include a first panel (e.g., the first panel 210 of FIG. 4) including a first surface, a second surface opposite to the first surface, and a plurality of pixels disposed between the first surface and the second surface, a cover layer (e.g., the cover layer 230 of FIG. 4) disposed on the first surface of the first panel, and a second panel (e.g., the second panel 220 of FIG. 4) disposed on the second surface of the first panel. A sensor may be coupled to the second surface of the first panel. For example, the sensor may form a sensing area (e.g., the sensing area 110F of FIG. 1) on one surface of the housing. The display module may include an opening (e.g., the opening 225 of FIG. 4) passing through the second panel and in which at least a portion of the sensor is disposed. The second panel may include a first layer (e.g., the first layer 520 of FIG. 5) coupled to the first panel on one surface thereof and a second layer (e.g., the second layer 530 of FIG. 5) coupled to the first layer on an opposite surface of one surface of the first layer. The opening may correspond to an area on which the first opening (e.g., the third opening 1510 of FIG. 15) formed in the first layer and the second opening (e.g., the fourth opening 1520 of FIG. 15) formed in the second layer overlap each other. The sensor may include a flexible printed circuit board (FPCB) (e.g., the FPCB 820 of FIG. 8) extending in the first direction from the mounting area of the sensor. The second opening may include an area corresponding to the first opening and a protrusion (e.g., the protrusion 1525 of FIG. 15) extending from the area corresponding to the first opening in the first direction.

According to an example embodiment, the second layer may include a conductive layer providing electrical shielding, and the first layer may include a layer providing optical shielding.

According to an example embodiment, the first layer may include at least one of an adhesive layer (e.g., adhesive layer 324 in FIG. 5) for allowing the first layer to adhere to the first panel, a black layer (e.g., the black layer 323 of FIG. 5) providing the optical shielding, or a polymer layer (e.g., the polymer layer 322 of FIG. 5) including an embossing pattern.

According to an example embodiment, the second layer may include at least one of a buffer member (buffer member 321 in FIG. 5) including a buffer material, a shielding layer (e.g., the shield layer 222 of FIG. 4) that provides the electrical shielding, or a heat dissipation layer (e.g., the heat dissipation layer 223 of FIG. 4). For example, the shielding layer may correspond to a copper sheet.

According to an example embodiment, the opening may be formed by coupling the first layer to the second layer after forming the third opening (e.g., the second opening 910 of FIG. 9) of an area at least including the protrusion in the second layer to punch an area (e.g., the first opening 920 of FIG. 10) corresponding to the shape of the first opening. As another example, the opening may be formed by coupling the first layer to the second layer after forming the second opening in the second layer and forming the first opening in the first layer. For example, the opening may be larger than a mounting area of the sensor.

According to an example embodiment, the electronic device may further include a processor, and the sensor may be electrically connected to the processor through the FPCB. The processor may be configured to acquire biometric information received by the sensor through the first panel using the sensor.

According to an example embodiment, the first panel may further include a protection film forming the second surface.

According to an example embodiment, the second layer may include a third surface to which the second layer is coupled to the first layer and a fourth surface facing a direction opposite to the third surface. The display module may further include a shielding member (e.g., the shielding member 1210 of FIG. 12) attached to the fourth surface of the second layer, covering at least a portion of the first opening, and providing the optical shielding.

According to various example embodiments, the display device (e.g., the display 101 of FIG. 1) may include a first panel (e.g., the first panel 210 of FIG. 4) including a first surface, a second surface opposite to the first surface, and a plurality of pixels disposed between the first surface and the second surface, a cover layer (e.g., the cover layer 230 of FIG. 4) disposed on the first surface of the first panel and forming one surface of the housing, and a second panel (e.g., the second panel 220 of FIG. 4) disposed on the second surface of the first panel. The display device may include an opening (e.g., the opening 225 of FIG. 4) passing through at least a portion of the second panel and in which at least a portion of the sensor (e.g., the sensor 240 of FIG. 4) is disposed. The second panel may include a first layer (e.g., the first layer 520 of FIG. 5) coupled to the first panel on one surface thereof and a second layer (e.g., the second layer 530 of FIG. 5) coupled to the first layer on an opposite surface of one surface of the first layer. The opening may correspond to an area on which the first opening (e.g., the third opening

1510 of FIG. 15) formed in the first layer and the second opening (e.g., the fourth opening 1520 of FIG. 15) formed in the second layer overlap each other. The sensor may include a flexible printed circuit board (FPCB) (e.g., the FPCB 820 of FIG. 8) extending in the first direction from the mounting area of the sensor. The second opening may include an area corresponding to the first opening and an extension part (e.g., the protrusion 1525 of FIG. 15) extending from the area corresponding to the first opening in the first direction.

According to an example embodiment, the second layer may include a conductive layer providing electrical shielding, and the first layer may include a layer providing optical shielding.

According to an example embodiment, the first layer may include at least one of an adhesive layer (e.g., adhesive layer 324 in FIG. 5) for allowing the first layer to adhere to the first panel, a black layer (e.g., the black layer 323 of FIG. 5) providing the optical shielding, or a polymer layer (e.g., the polymer layer 322 of FIG. 5) including an embossing pattern.

According to an example embodiment, the second layer may include at least one of a buffer member (buffer member 321 in FIG. 5) including a buffer material, a shielding layer (e.g., the shield layer 222 of FIG. 4) that provides the electrical shielding, or a heat dissipation layer (e.g., the heat dissipation layer 223 of FIG. 4). For example, the shielding layer may comprise a copper sheet.

According to an example embodiment, the opening may be formed by coupling the first layer to the second layer after forming the third opening (e.g., the second opening 910 of FIG. 9) of an area at least including the extension part in the second layer to punch an area (e.g., the first opening 920 of FIG. 10) corresponding to the shape of the first opening. The opening may be formed by coupling the first layer to the second layer after forming the second opening in the second layer and forming the first opening in the first layer. For example, the opening may be larger than a mounting area of the sensor.

According to an example embodiment, the second layer may include a third surface to which the second layer is coupled to the first layer and a fourth surface facing a direction opposite to the third surface. The display module may further include a shielding member (e.g., the shielding member 1210 of FIG. 12) attached to the fourth surface of the second layer, covering the first opening, and providing the optical shielding. According to an embodiment, the first panel may further include a protection film forming the second surface.

According to an example embodiment, the sensor may be configured to acquire biometric information (e.g., fingerprint) based on ultrasonic waves. The sensor may be coupled to the first panel through an adhesive material (e.g., the adhesive material 1310 of FIG. 13) applied to the first panel through the opening.

Various embodiments of the present disclosure and terms used therein are not intended to limit the technology described in the present disclosure to a specific embodiment, but it should be understood to include various modifications, equivalents, and/or alternatives of the embodiments. In the description with reference to the drawings, like reference numerals may be used for referring to the same or similar components. The terms of a singular form may include plural forms unless referred to the contrary. In the present disclosure, expressions such as "A or B", "at least one of A and/or B", "A, B or C" or "at least one of A, B and/or C" may include all possible combinations of items listed together. Expressions such as "first", "second", "first" or "second" can modify the corresponding components, regardless of order or importance, and are used only to distinguish one component from other components, and does not limit the components. When any (e.g., first) component is referred to as being "connected (functionally or communicatively)" or "connected" to another (e.g., second) component, any component may be directly connected to the other component or may be connected through another component (e.g., a third component).

In the present disclosure, "adapted to or configured to", depending on the context, may refer, for example, to hardware or software "suitable for," "having the ability to," "modified to, may be used interchangeably with "changed to", "made to," "capable of," or "designed to." In some circumstances, the expression "a device configured to" may refer, for example, to the device being "capable of" with other devices or components. For example, the phrase "a processor configured (or configured to perform) A, B, and C" may refer, for example, to a dedicated processor (e.g., an embedded processor) for performing corresponding operations or a general-purpose processor (e.g., CPU or AP) capable of performing corresponding operations by executing one or more programs stored in a memory device.

As used herein, the term "module" includes a unit including hardware, software, firmware, or any combination thereof, and may be used interchangeably with terms such as, for example, logic, logic block, component, or circuit. The "module" may be an integrally formed component or a minimum unit or a portion of one or more functions. The "module" may be implemented mechanically or electronically, for example, may include application-specific integrated circuit (ASIC) chips, field-programmable gate arrays (FPGAs), or programmable logic devices, which perform certain operations and have been known or to be developed.

At least a portion of an apparatus (e.g., modules or functions thereof) or a method (e.g., operations) according to various embodiments may be implemented as instructions stored in a computer-readable storage medium in the form of a program module. When the instruction is executed by the processor, the processor may perform a function corresponding to the instruction. Computer-readable recording media may include hard disks, floppy disks, magnetic media (e.g., magnetic tape), optical recording media (e.g., CD-ROM, DVD, magneto-optical media (e.g., floppy disks), built-in memory, etc. The instructions may include a code generated by a compiler or a code executable by an interpreter.

According to various embodiments, each of the components (e.g. the modules or the programs) may include a single object or a plurality of objects. Here, some sub-components of the aforementioned sub-components may be omitted, or other sub-components may be further included. Alternatively or additionally, some components (e.g., the modules or the programs) may be integrated into one object to perform the same or similar functions of each corresponding component before the integration. According to various embodiments, the operations performed by the modules, the programs or other components may be performed sequentially, parallely, repetitively or heuristically, or at least partial operations may be carried out in different order, omitted, or added in a different order.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
   a housing;
   a sensor comprising a flexible printed circuit board (FPCB); and
   a display module comprising a first panel comprising a plurality of pixels disposed between a first surface and a second surface of the first panel, a cover layer disposed on the first surface of the first panel, and a second panel disposed on the second surface of the first panel and having an opening passing therethrough in which at least a portion of the sensor is disposed,
   wherein the sensor is attached to the second surface of the first panel in the opening,
   wherein the second panel comprises a first layer coupled to the first panel on one surface thereof and a second layer coupled to the first layer on an opposite surface of the one surface of the first layer,
   wherein the opening passing through the second panel corresponds to an area in which a first opening in the first layer and a second opening in the second layer overlap each other,
   wherein the second opening comprises a first area corresponding to the first opening and a second area extending in an extension direction from the first area and into which the FPCB extends, and
   wherein a second height of the second area in a lateral direction perpendicular to the extension direction is less than a first height of the first area in the lateral direction.

2. The electronic device of claim 1, wherein the second layer comprises a conductive layer configured to provide electrical shielding, and
   wherein the first layer comprises a layer configured to provide optical shielding.

3. The electronic device of claim 2, wherein the first layer comprises at least one of an adhesive layer configured to adhere the first layer to the first panel, a black layer configured to provide optical shielding, or a polymer layer including an embossing pattern.

4. The electronic device of claim 2, wherein the second layer comprises at least one of a buffer layer comprising a buffer material, a shielding layer configured to provide the electrical shielding, or a heat dissipation layer.

5. The electronic device of claim 4, wherein the shielding layer comprises a copper sheet.

6. The electronic device of claim 1, wherein the opening is formed by coupling the first layer to the second layer after forming a third opening of an area at least including the second area in the second layer to punch an area corresponding to a shape of the first opening.

7. The electronic device of claim 1, wherein the opening is formed by coupling the first layer to the second layer after forming the second opening in the second layer and forming the first opening in the first layer.

8. The electronic device of claim 1, further comprising a processor,
   wherein the sensor comprises a biometric sensor and is electrically connected to the processor through the FPCB, and
   wherein the processor is configured to acquire biometric information received by the sensor.

9. The electronic device of claim 1, wherein the second layer comprises a third surface on which the second layer is coupled to the first layer and a fourth surface opposed to the third surface, and
   wherein the display module further comprises a shielding member comprising a substantially opaque material attached to the fourth surface of the second layer and covering at least a portion of the first opening.

10. A display device comprising:
    a first panel comprising a plurality of pixels disposed between a first surface and a second surface;
    a cover layer disposed on the first surface of the first panel; and
    a second panel disposed on the second surface of the first panel and having an opening passing through at least a portion thereof in which at least a portion of a sensor is disposed,
    wherein the second panel comprises a first layer coupled to the first panel on one surface thereof and a second layer coupled to the first layer on an opposite surface of the one surface of the first layer,
    wherein the opening passing through the at least a portion of the second panel corresponds to an area in which a first opening in the first layer and a second opening in the second layer overlap each other,
    wherein the second opening comprises a first area corresponding to the first opening and a second area extending in an extension direction from the first area and into which a FPCB connected to the sensor extends, and
    wherein a second height of the second area in a lateral direction perpendicular to the extension direction is less than a first height of the first area in the lateral direction.

11. The display device of claim 10, wherein the second layer comprises a conductive layer configured to provide electrical shielding, and
    wherein the first layer comprises a shielding layer configured to provide optical shielding.

12. The display device of claim 11, wherein the first layer comprises at least one of an adhesive layer configured to adhere the first layer to the first panel, a black layer configured to provide the optical shielding, or a polymer layer including an embossing pattern.

13. The display device of claim 11, wherein the second layer comprises at least one of a buffer layer comprising a buffer material, a shielding layer configured to provide the electrical shielding, or a heat dissipation layer.

14. The display device of claim 13, wherein the shielding layer comprises a copper sheet.

* * * * *